(12) United States Patent
Verma et al.

(10) Patent No.: US 11,398,895 B2
(45) Date of Patent: Jul. 26, 2022

(54) INFORMATION MANAGEMENT IN A DECENTRALIZED DATABASE INCLUDING A FAST PATH SERVICE

(71) Applicant: International Business Machines Corporation, Armonk, NY (US)

(72) Inventors: Dinesh C. Verma, New Castle, NY (US); Donna N. Dillenberger, Yorktown Heights, NY (US); Martin Oberhofer, Boeblingen (DE); Namik Hrle, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 522 days.

(21) Appl. No.: 16/364,999

(22) Filed: Mar. 26, 2019

(65) Prior Publication Data
US 2020/0313853 A1 Oct. 1, 2020

(51) Int. Cl.
*H04L 9/06* (2006.01)
*H04L 67/1074* (2022.01)
*H04L 9/00* (2022.01)

(52) U.S. Cl.
CPC .......... *H04L 9/0637* (2013.01); *H04L 9/0643* (2013.01); *H04L 67/108* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 9,081,627 B1 * | 7/2015 | Blanding | G06F 9/4881 |
| 10,333,694 B1 * | 6/2019 | Hu | G06F 16/1805 |
| 10,432,405 B1 * | 10/2019 | Hu | H04L 9/3242 |
| 10,484,168 B2 * | 11/2019 | Ford | H04L 67/104 |
| 10,484,341 B1 | 11/2019 | Todd et al. | |
| 10,579,974 B1 * | 3/2020 | Reed | G06Q 20/065 |
| 10,587,680 B2 * | 3/2020 | Ananthapadmanabh | H04L 67/1008 |
| 10,659,386 B2 * | 5/2020 | Sesha | H04L 67/1095 |
| 10,693,954 B2 | 6/2020 | Kozloski et al. | |
| 10,862,821 B1 * | 12/2020 | Jonsson | H04L 41/18 |
| 10,893,022 B1 * | 1/2021 | Li | H04L 45/748 |
| 10,917,233 B2 | 2/2021 | Ojha et al. | |
| 11,042,424 B1 * | 6/2021 | Sysoev | G06F 9/3869 |
| 11,082,204 B2 | 8/2021 | Davis | |
| 11,095,433 B2 | 8/2021 | Vouk et al. | |

(Continued)

OTHER PUBLICATIONS

Yewale; "Study of Blockchain-as-a-Service Systems with a Case Study of Hyperledger Fabric Implementation on Kubernetes"; 2018; Retrieved from the Internet https://digitalscholarship.unlv.edu/cgi/viewcontent.cgi?article=4395&context=thesesdissertations; pp. 1-92, as printed. (Year: 2018).*

(Continued)

*Primary Examiner* — Michael W Chao

(57) ABSTRACT

An example operation may include one or more of hosting a first virtual node in a blockchain-as-a-service (Baas) provider, hosting a second virtual node in the Baas provider, and controlling transmission of information between the first virtual node and the second virtual node along an internal signal path of the Baas provider, wherein the information corresponds to a block in a blockchain that includes an entry for the first and second virtual nodes.

20 Claims, 22 Drawing Sheets

(56) References Cited

U.S. PATENT DOCUMENTS

| | | | |
|---|---|---|---|
| 11,126,596 B2 | 9/2021 | Wang | |
| 11,138,188 B2 | 10/2021 | Chao et al. | |
| 11,139,980 B2 | 10/2021 | Herrin et al. | |
| 2010/0131592 A1* | 5/2010 | Zhang | G06F 9/5044 709/203 |
| 2011/0238458 A1* | 9/2011 | Purcell | G06F 9/5072 705/7.27 |
| 2012/0005685 A1* | 1/2012 | Chen | G06F 9/5072 718/104 |
| 2012/0116980 A1* | 5/2012 | Mercuri | G06Q 10/103 705/301 |
| 2013/0166703 A1* | 6/2013 | Hammer | H04L 63/10 709/220 |
| 2013/0346470 A1* | 12/2013 | Obstfeld | G06F 9/5044 709/202 |
| 2014/0040884 A1* | 2/2014 | Donahue | G06F 9/4401 718/1 |
| 2014/0280961 A1* | 9/2014 | Martinez | H04L 41/5054 709/226 |
| 2016/0162004 A1* | 6/2016 | Ljubuncic | G06F 9/505 713/320 |
| 2017/0124556 A1 | 5/2017 | Seger | |
| 2017/0134161 A1 | 5/2017 | Goeringer et al. | |
| 2017/0213209 A1 | 7/2017 | Dillenberger | |
| 2017/0236123 A1 | 8/2017 | Ali et al. | |
| 2017/0257432 A1* | 9/2017 | Fu | H04L 67/2823 |
| 2017/0329980 A1 | 11/2017 | Hu et al. | |
| 2017/0346752 A1* | 11/2017 | Krishnamurthy | H04L 45/306 |
| 2018/0103042 A1 | 4/2018 | Castagna et al. | |
| 2018/0103088 A1* | 4/2018 | Blainey | H04L 67/1008 |
| 2018/0129503 A1* | 5/2018 | Narayan | H03K 19/0175 |
| 2018/0139186 A1 | 5/2018 | Castagna | |
| 2018/0158034 A1* | 6/2018 | Hunt | G06Q 20/027 |
| 2018/0189100 A1 | 7/2018 | Nemoto et al. | |
| 2018/0204213 A1* | 7/2018 | Zappier | H04L 63/065 |
| 2018/0227275 A1* | 8/2018 | Russinovich | G06Q 20/00 |
| 2018/0323964 A1 | 11/2018 | Watanabe et al. | |
| 2018/0330348 A1 | 11/2018 | Uhr et al. | |
| 2018/0351732 A1 | 12/2018 | Wang | |
| 2018/0352033 A1* | 12/2018 | Pacella | H04L 67/10 |
| 2018/0365079 A1* | 12/2018 | Koch | G06F 3/0652 |
| 2019/0013948 A1 | 1/2019 | Mercuri et al. | |
| 2019/0052453 A1* | 2/2019 | de Ligt | H04L 9/0637 |
| 2019/0058709 A1* | 2/2019 | Kempf | H04L 63/0876 |
| 2019/0236606 A1 | 8/2019 | Padmanabhan et al. | |
| 2019/0238316 A1 | 8/2019 | Padmanabhan | |
| 2019/0268421 A1* | 8/2019 | Markuze | H04L 67/10 |
| 2019/0294514 A1 | 9/2019 | Tang | |
| 2019/0318350 A1 | 10/2019 | Hinkel et al. | |
| 2019/0332586 A1 | 10/2019 | Wang | |
| 2019/0379768 A1* | 12/2019 | Amicangioli | H04L 1/08 |
| 2019/0384933 A1* | 12/2019 | Lebel | G07F 7/1091 |
| 2020/0034353 A1* | 1/2020 | Innocenti | H04L 9/0637 |
| 2020/0127812 A1 | 4/2020 | Schuler et al. | |
| 2020/0142986 A1* | 5/2020 | Ragnoli | G06F 16/2379 |
| 2020/0153605 A1 | 5/2020 | Hu et al. | |
| 2020/0162324 A1* | 5/2020 | Amburey | H04L 41/0816 |
| 2020/0218512 A1* | 7/2020 | Chen | G06F 9/4881 |
| 2020/0242595 A1* | 7/2020 | Harrison | H04L 67/1097 |
| 2020/0351116 A1* | 11/2020 | Jetzfellner | G06F 21/62 |
| 2021/0011753 A1* | 1/2021 | Opsenica | G06F 9/45558 |
| 2021/0081404 A1* | 3/2021 | Kempf | H04L 9/321 |
| 2021/0142324 A1 | 5/2021 | Li | |
| 2021/0160058 A1 | 5/2021 | Zhang et al. | |
| 2021/0182423 A1* | 6/2021 | Padmanabhan | G06F 21/64 |
| 2021/0241282 A1 | 8/2021 | Gu et al. | |
| 2021/0312552 A1 | 10/2021 | Simpson | |
| 2022/0103584 A1* | 3/2022 | Tobin | H04L 63/1466 |

OTHER PUBLICATIONS

Singh et al.; "Blockchain as a Service (BAAS): Providers and Trust"; 2018; Retrieved from the Internet https://ieeexplore.ieee.org/abstract/document/8406562/; pp. 1-8, as printed. (Year: 2018).*

List of IBM Patents or Patent Applications Treated as Related, todays date.

D. Verma et al., "Information Management in a Decentralized Database Including a Fast Path Service"; U.S. Appl. No. 16/365,061, filed Mar. 26, 2019 (a copy is not provided as this application is available to the Examiner).

D. Verma et al., "Information Management in a Decentralized Database Including a Fast Path Service"; U.S. Appl. No. 16/364,932, filed Mar. 26, 2019 (a copy is not provided as this application is available to the Examiner).

R. Pass et al.; "TunderCore," Thunder Research. Retrieved from Internet using: https://docs.thundercore.com/thunder-litepaper.pdf.

Z. Ming et al., "Blockcloud: A Blockchain-based Service-centric Network Stack,", retrieved from internet using: https://www.blockcloud.io/blockcloudtechnicalwhitepaper.pdf.

* cited by examiner

500

1500

1800

INFORMATION MANAGEMENT IN A DECENTRALIZED DATABASE INCLUDING A FAST PATH SERVICE

TECHNICAL FIELD

This application generally relates to a database storage system, and more particularly, to information management in a decentralized database including a fast path service.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database needs to be operated by a universally trusted entity. Furthermore, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same data at the same time without creating significant problems or risk overwriting stored data. Also, because a database storage system has minimal to no data redundancy, data that is unexpectedly lost is very difficult to retrieve other than through manual operation from back-up storage.

SUMMARY

One example embodiment provides a system that includes a blockchain-as-a-service (Baas) provider and a first virtual node hosted by the Baas provider. The Baas provider includes a manager to determine that data at the first virtual node satisfies a condition, obtain a pointer to a shared storage area that is to store the data, control generation of a block including the pointer, and append the block to a blockchain without the data. The condition may be whether the data exceeds a predetermined size. The first virtual node includes blockchain software which receives the data from a blockchain application in the same node or external to the Baas provider. A second virtual node may receive the pointer for purposes of accessing the data at the shared file location. The second virtual node may receive the pointer, for example, by querying the blockchain for the block storing the pointer or based on information transmitted internal to the Baas provider.

Another example embodiment provides a method that includes one or more of determining data at a first node satisfies a condition, obtaining a pointer to a shared storage area for the data, controlling generation of a block including the pointer, and appending the block to a blockchain without the data. The first node corresponds to first virtual node hosted by blockchain-as-a-service (Baas) provider, and the first virtual node receives the data from a network coupled to the Baas provider. The condition may be whether the data exceeds a predetermined size. The first virtual node includes blockchain software which receives the data from a blockchain application in the same node or external to the Baas provider. A second virtual node may receive the pointer for purposes of accessing the data at the shared file location. The second virtual node may receive the pointer, for example, by querying the blockchain for the block storing the pointer or based on information transmitted internal to the Baas provider.

A further example embodiment provides a non-transitory computer readable medium comprising instructions a non-transitory computer-readable medium comprising instructions, that when read by a manager of a blockchain-as-a-service (Baas) provider, cause the manager to perform one or more of determine that data received by a first virtual node hosted by the Baas provider satisfies a condition, obtain a pointer to a shared storage area that is to store the data, control generation of a block including the pointer, and append the block to a blockchain without the data.

A further example embodiment provides a system including a first virtual node, a second virtual node, and a manager to control transmission of information between the first virtual node and the second virtual node. The first and second virtual nodes are hosted by a blockchain-as-a-service (Baas) provider. The information is transmitted along an internal signal path of the Baas provider and corresponds to a block in a blockchain that includes an entry for the first and second virtual nodes. The Baas provider may include a first server and a second server, where the first server manages the first virtual node and the second server manages the second virtual node.

A further example embodiment provides a method that includes one or more of hosting a first virtual node in a blockchain-as-a-service (Baas) provider, hosting a second virtual node in the Baas provider, and controlling transmission of information between the first virtual node and the second virtual node along an internal signal path of the Baas provider. The information corresponds to a block in a blockchain that includes an entry for the first and second virtual nodes. The Baas provider may include a first server and a second server, where the first server manages the first virtual node and the second server manages the second virtual node.

A further example embodiment provides a non-transitory computer-readable medium comprising instructions, that when read by logic of a Blockchain-as-service (Baas) provider, causes the logic to perform one or more of host a first virtual node in the Baas provider, host a second virtual node in the Baas provider, and control transmission of information between the first virtual node and the second virtual node on an internal signal path of the Baas provider, wherein the information corresponds to a block in a blockchain that includes an entry for the first and second virtual nodes. The Baas provider may include a first server and a second server, where the first server manages the first virtual node and the second server manages the second virtual node.

A further example embodiment provides a system including a first queue, a second queue, and a manager of a blockchain-as-a-service (Baas) provider. The manager controls placement of an entry into a first queue when a first set of policies is satisfied and controls placement of the entry into a second queue when the first set of policies is not satisfied. The first queue stores confirmed entries to be submitted for consensus without validation and the second queue stores pending entries that require validation before consensus.

A further example embodiment provides a method that includes one or more of receiving an entry at a blockchain-as-a-service (Baas) provider, determining whether the entry satisfies a first set of policies, and controlling placement of the entry into a first queue when the first set of policies is satisfied and into a second queue when the first set of policies is not satisfied. The first queue stores confirmed entries to be submitted for consensus without validation and the second queue stores pending entries that require validation before consensus.

A further example embodiment provides a non-transitory computer-readable medium comprising instructions, that when read by a manager of a blockchain-as-a-service (Baas) provider, cause the manager to perform one or more of receive an entry, determine whether the entry satisfies a first set of policies, control placement of the entry into a first queue when the first set of policies is satisfied and into a second queue when the first set of policies is not satisfied. The first queue stores confirmed entries to be submitted for consensus without validation and the second queue stores pending entries that require validation before consensus.

DETAILED DESCRIPTION

Figure 1:
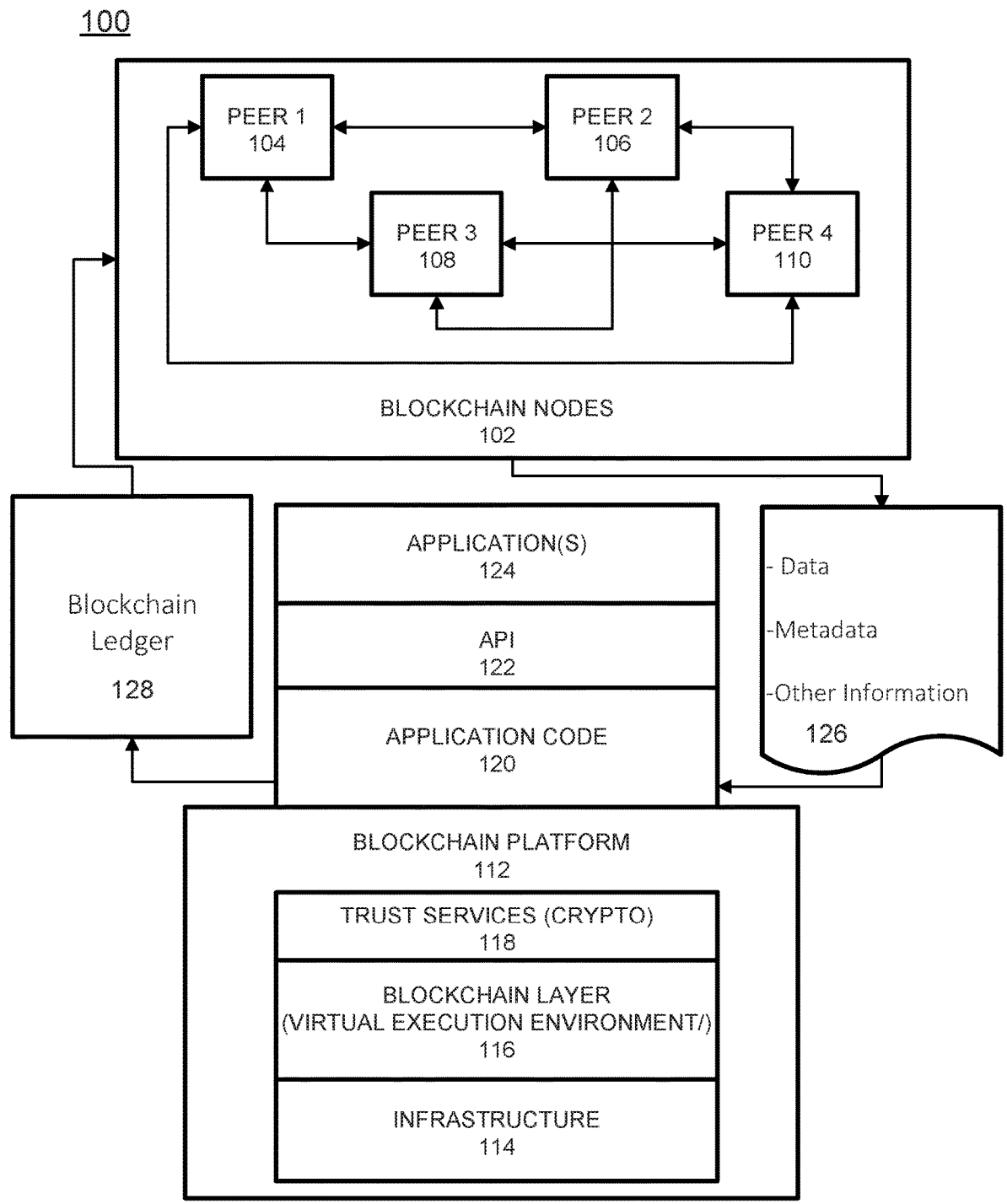
FIG. 1 illustrates an embodiment of a blockchain architecture configuration.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein FIG. 1 illustrates a blockchain architecture configuration 100, according to example embodiments. Referring to FIG. 1, the blockchain architecture 100 may include certain blockchain elements, for example, a group of blockchain nodes 102. The blockchain nodes 102 may include one or more nodes 104-110 (these four nodes are depicted by example only). These nodes participate in a number of activities, such as blockchain transaction addition and validation process (consensus). One or more of the blockchain nodes 104-110 may endorse transactions based on endorsement policy and may provide an ordering service for all blockchain nodes in the architecture 100. A blockchain node may initiate a blockchain authentication and seek to write to a blockchain immutable ledger stored in blockchain layer 116, a copy of which may also be stored on the underpinning physical infrastructure 114. The blockchain configuration may include one or more applications 124 which are linked to application programming interfaces (APIs) 122 to access and execute stored program/application code 120 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 104-110.

The blockchain base or platform 112 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 116 may expose an interface that provides access to the virtual execution environment to process the program code and engage the physical infrastructure 114. Cryptographic trust services 118 may be used to verify transactions such as asset exchange transactions and keep information private.

The blockchain architecture configuration of FIG. 1 may process and execute program/application code 120 via one or more interfaces exposed, and services provided, by blockchain platform 112. The code 120 may control blockchain assets. For example, the code 120 can store and transfer data, and may be executed by nodes 104-110 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information 126 may include data, metadata, key information, messages, events, or other information that may be processed by one or more processing entities (e.g., virtual machines) included in the blockchain layer 116. The result 128 may include access, querying, adding one or more new blocks to the blockchain, and then updating and outputting the blockchain ledger to the nodes. The physical infrastructure 114 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2:
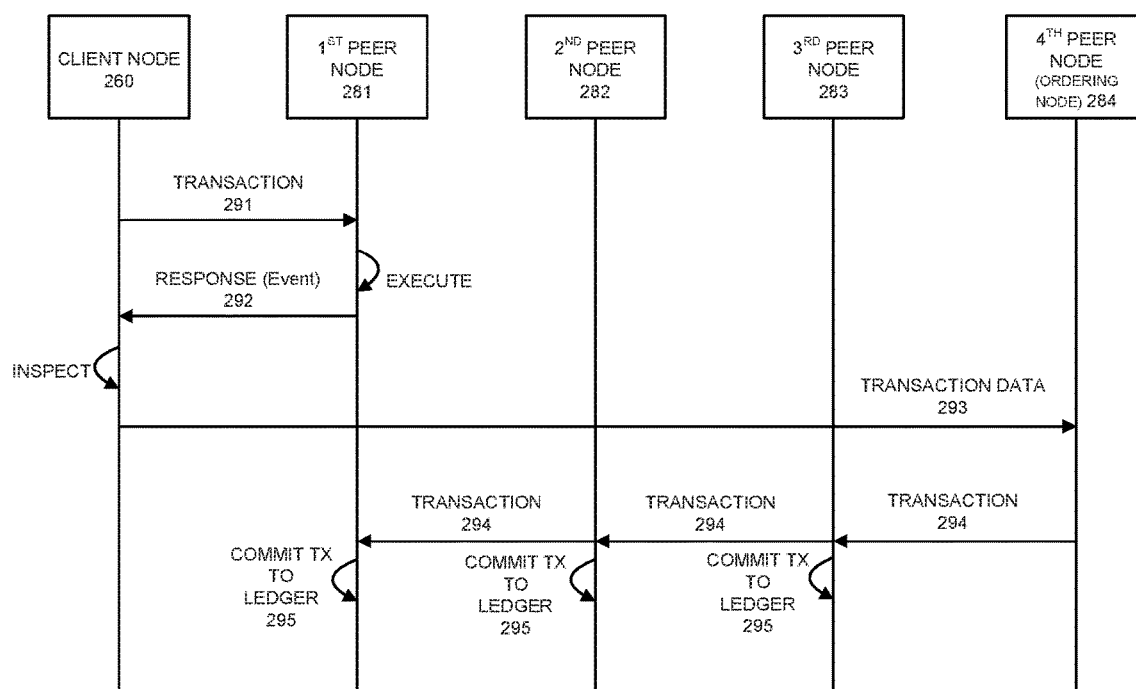
FIG. 2 illustrates an embodiment of a transactional flow between nodes of a blockchain.

FIG. 2 illustrates an example of a transactional flow 250 between nodes of the blockchain in accordance with an example embodiment. Referring to FIG. 2, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the signatures of the endorsing peers and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (e.g., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
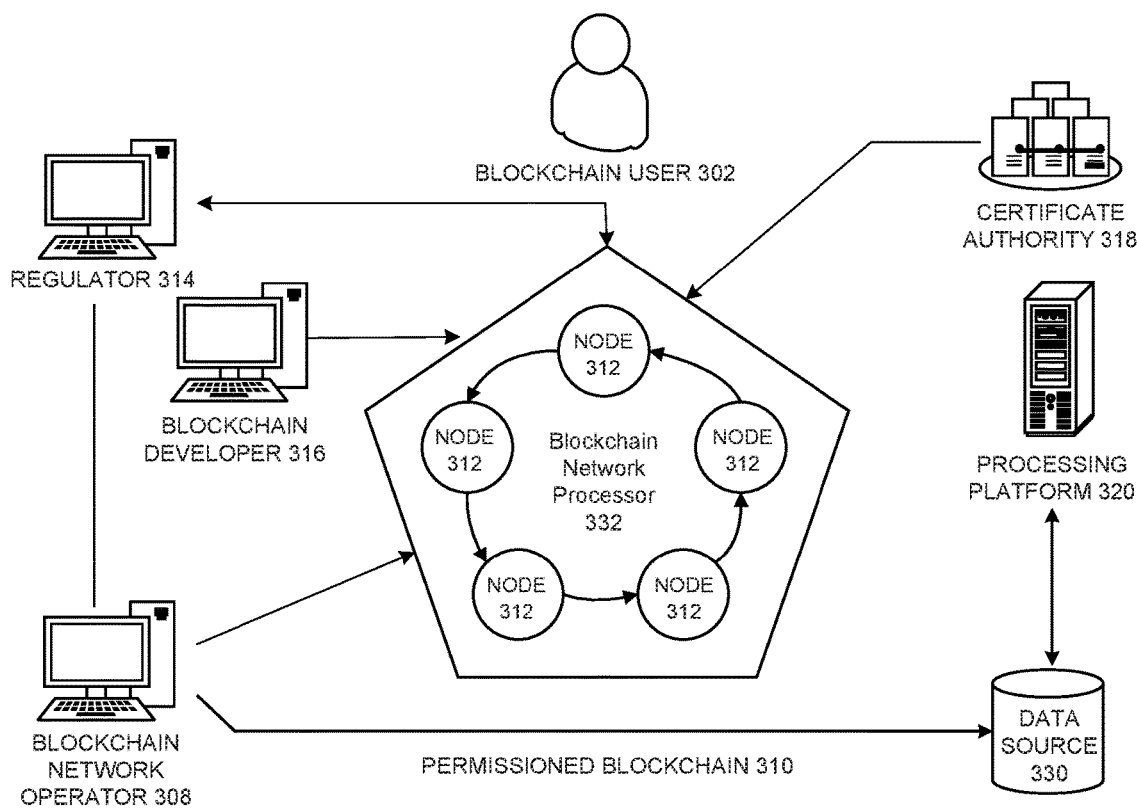
FIG. 3 illustrates an example of a permissioned blockchain network.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke, or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client". An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the blockchain network processor 332 through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
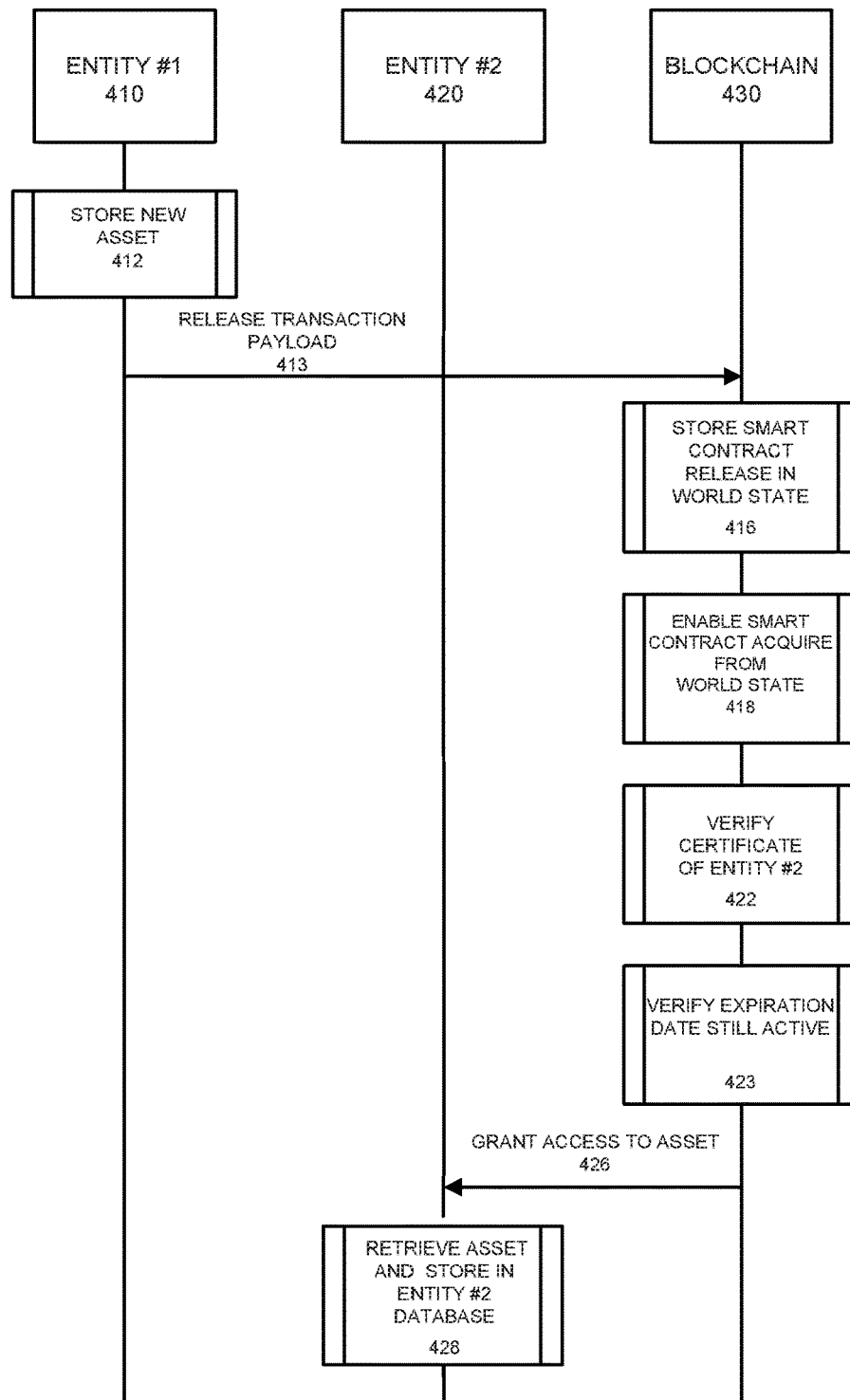
FIG. 4 illustrates an embodiment of messaging in the blockchain network.

FIG. 4 illustrates an embodiment of messaging 400 that may take place between participants, or entities/users, 410 and 420 of the blockchain network and the blockchain 430. In 412, an entity 410 stores a new asset (e.g., some form of processing of the evidence protected by the blockchain) to be added in a block of the blockchain 430. A transaction payload is then released to the blockchain 430 at 413. A Smart Contract release in the world state of the blockchain is then stored at 416. Acquisition of the Smart Contract is then enabled from the world state at 418. A certificate of entity 2 is then verified, at 422, and a check is performed to verify that the expiration date of the certificate has not expired, e.g., is still active, at 423. Access to the blockchain network, or other action sought to be taken by entity 2, is then granted, at 426, and the asset (e.g., evidence) requested by entity 2 is then retrieved, at 428, from the blockchain network and made accessible to entity 2. These messaging operations may be performed, for example, in association with a processor or managing entity/software of the blockchain network through one or more appropriate interfaces.

Figure 5:
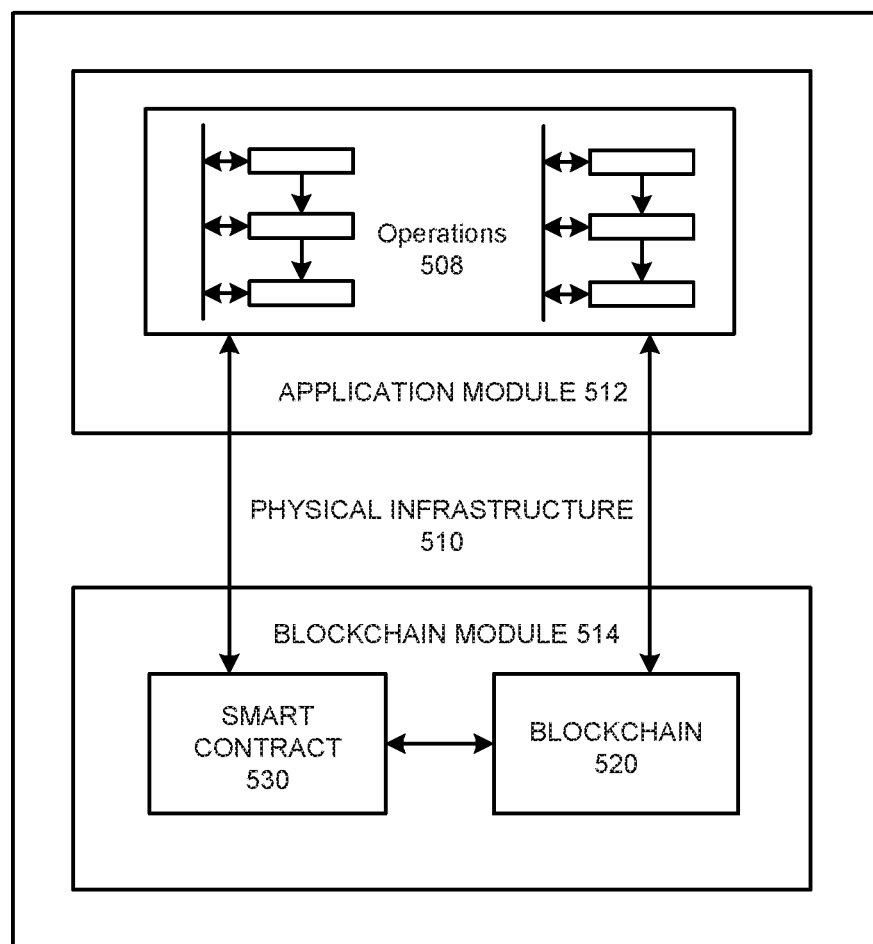
FIG. 5 illustrates an embodiment of a system for performing operations in a blockchain.

FIG. 5 illustrates an embodiment of a system 500 that includes a physical infrastructure 510 configured to perform various operations for the blockchain. The physical infrastructure 510 includes a module 512 and a module 514. The module 514 includes a blockchain 520 and a smart contract 530 (which may reside on the blockchain 520), that may execute any of the operations 508 (in module 512) included in any of the example embodiments. The operations 508 may include one or more of the embodiments described or depicted and may represent output or written information that is written or read from one or more smart contracts 530 and/or blockchain 520. The physical infrastructure 510, the module 512, and the module 514 may include one or more computers, servers, processors, memories, and/or wireless communication devices. Further, the module 512 and the module 514 may be a same module.

Figure 6:
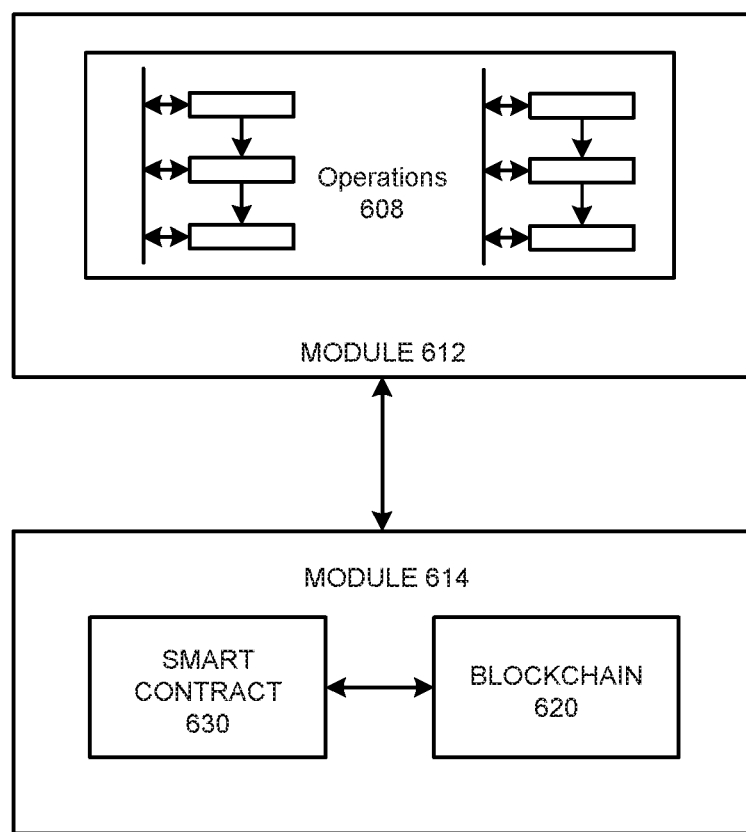
FIG. 6 illustrates another embodiment of a system to perform operations in a blockchain.

FIG. 6 illustrates another system 600 configured to perform various operations according to example embodiments. Referring to FIG. 6, the system 600 includes a module 612 and a module 614. The module 614 includes a blockchain 620 and a smart contract 630 (which may reside on the blockchain 620), that may execute any of the operational steps 608 (in module 612) included in any of the example embodiments. The operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 7:
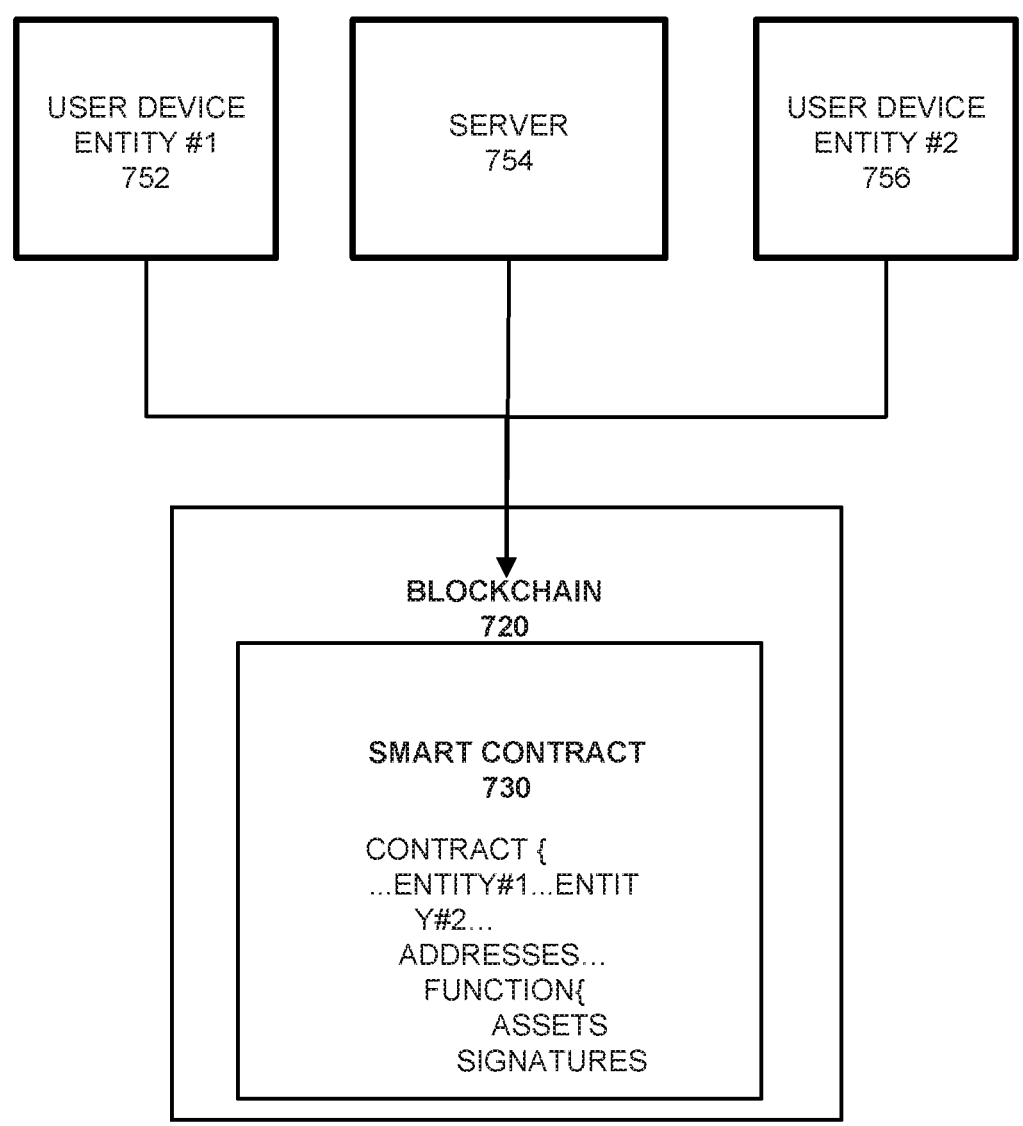
FIG. 7 illustrates an embodiment of a Smart Contract configuration for a blockchain.

FIG. 7 illustrates an embodiment of a Smart Contract configuration 750 among contracting parties and a mediating server configured to enforce the Smart Contract rules/terms on the blockchain. The configuration 750 may represent a communication session, an asset transfer session or a process or procedure that is driven by a Smart Contract 730 which explicitly identifies one or more user devices 752 and/or 756. The execution, operations and results of the Smart Contract execution may be managed by a server 754. Content of the Smart Contract 730 may require digital signatures by one or more of the entities 752 and 756 which are parties to the Smart Contract transaction. The results of the Smart Contract execution may be written to a blockchain 720 as a blockchain transaction. The Smart Contract 730 resides on the blockchain 720, which may reside on one or more computers, servers, processors, memories, and/or wireless communication devices. The blockchain 720 may include digital evidence as discussed herein.

Figure 8:
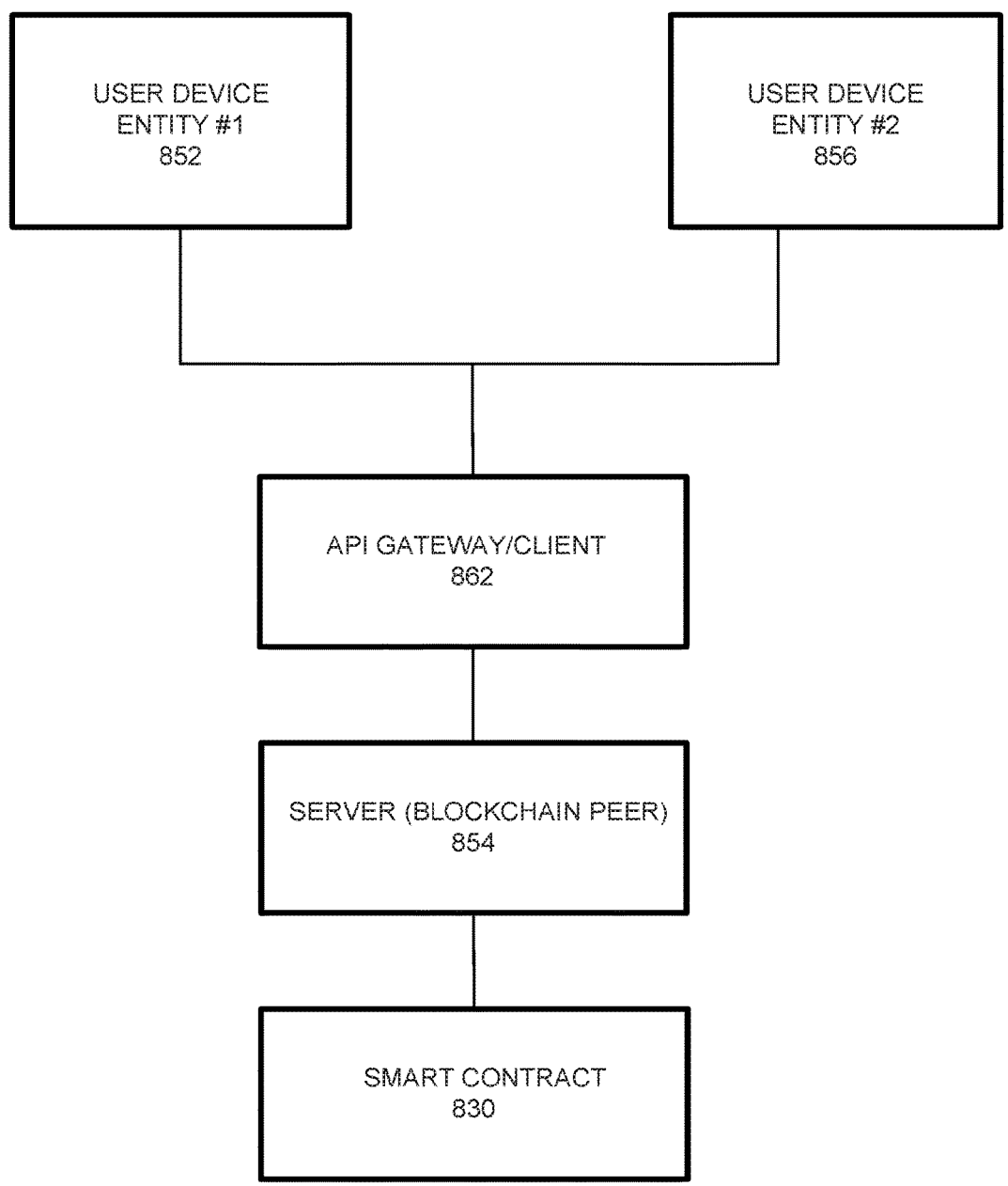
FIG. 8 illustrates an embodiment of an application programming interface (API) gateway for accessing a blockchain and/or associated elements.

FIG. 8 illustrates an embodiment of a system 860 including an application programming interface (API) gateway 862 provides a common interface to access blockchain logic (e.g., Smart Contract 830 or other chaincode) and data (e.g., distributed ledger, etc.). In this example, the API gateway 862 is a common interface to perform transactions (invoke, queries, etc.) on the blockchain by connecting one or more entities 852 and 856 to a blockchain peer (e.g., server 854). The server 854 may be a blockchain network peer component that holds a copy of the world state and a distributed ledger allowing clients 852 and 856 to query data on the world state, as well as submit transactions into the blockchain network where, depending on the Smart Contract 830 and endorsement policy, endorsing peers will run the smart contracts 830. The Smart Contracts shown in FIGS. 5-8 may be the same or different. In one embodiment, each participant in the blockchain network may store a copy of the distributed ledger and blockchain with an immutable history of all the transactions that took place in the network relative to the blockchain.

The embodiments described herein may be implemented in hardware, in a computer program executed by a processor, in firmware, or in a combination of the above. A computer program may be embodied on a computer-readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium.

An exemplary storage medium may be coupled to the processor such that the processor may read information from, and write information to, the storage medium. In one embodiment, the storage medium may be integral to the processor. The processor and the storage medium may reside in an application specific integrated circuit ("ASIC"). In one embodiment, the processor and the storage medium may reside as discrete components.

Figure 9A:
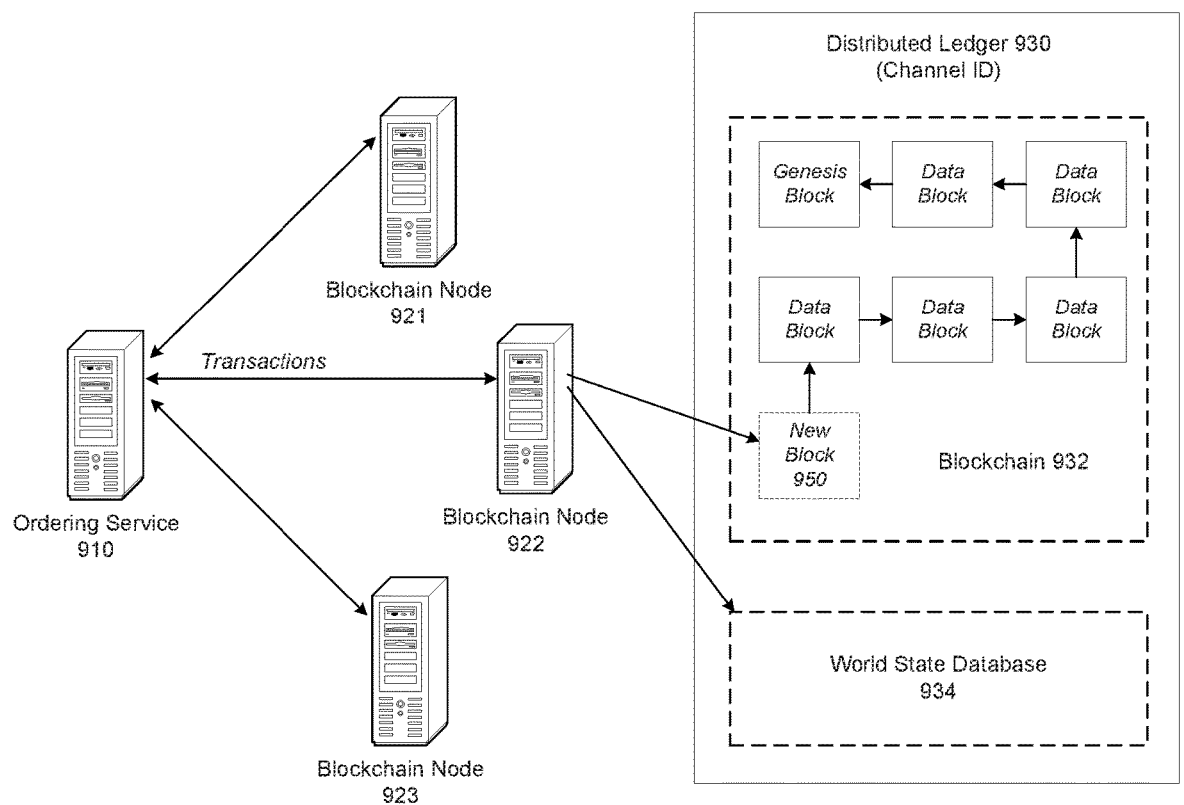
FIG. 9A illustrates an embodiment of a process to add a new block to a distributed ledger of a blockchain.
Figure 9B:
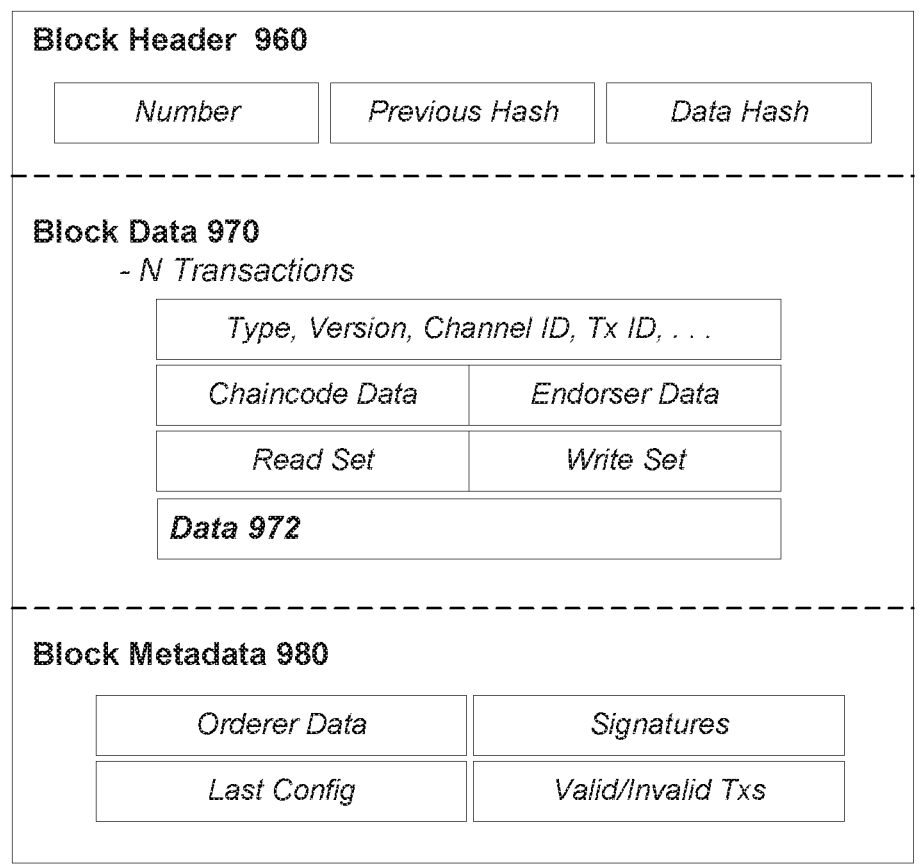
FIG. 9B illustrates an example of a block structure for the blockchain.

FIG. 9A illustrates an embodiment of a process 900 to add a new block to a distributed ledger 930 of the blockchain, and FIG. 9B illustrates an example of a block structure 950 for the blockchain.

Referring to FIG. 9A, clients may submit transactions to blockchain nodes 921, 922, and/or 923. Clients may be instructions received from any source to enact activity on the blockchain 930. As an example, clients may be applications that act on behalf of a requester, such as a device, person or entity to propose transactions for the blockchain. The plurality of blockchain peers (e.g., blockchain nodes 921, 922, and 923) may maintain a state of the blockchain network and a copy of the distributed ledger 930. Different types of blockchain nodes/peers may be present in the blockchain network including endorsing peers which simulate and endorse transactions proposed by clients and committing peers which verify endorsements, validate transactions, and commit transactions to the distributed ledger 930. In this example, the blockchain nodes 921, 922, and 923 may perform the role of endorser node, committer node, or both.

The distributed ledger 930 includes a blockchain 932 which stores immutable, sequenced records in blocks, and a state database 934 (current world state) maintaining a current state of the blockchain 932. One distributed ledger 930 may exist per channel and each peer maintains its own copy of the distributed ledger 930 for each channel of which they are a member. The blockchain 932 is a transaction log, structured as hash-linked blocks where each block contains a sequence of N transactions. Blocks may include various components such as illustrated in FIG. 9B. Linking of the blocks may be generated by adding a hash of the header of a previous block within the header of a current block. In this way, all transactions on the blockchain 932 are sequenced and cryptographically linked together preventing tampering with blockchain data without breaking the hash links. Furthermore, because of the links, the latest block in the blockchain 932 represents every transaction that has come before it. The blockchain 932 may be stored on a peer file system (local or attached storage), which supports an append-only blockchain workload.

The current state of the blockchain 932 and the distributed ledger 932 may be stored in the state database 934. The current state data may represent, for example, the latest values for all keys ever included in the chain transaction log of the blockchain 932. Chaincode invocations execute transactions against the current state in the state database 934. To make these chaincode interactions extremely efficient, the latest values of all keys are stored in the state database 934. The state database 934 may include an indexed view into the transaction log of the blockchain 932, it can therefore be regenerated from the chain at any time. The state database 934 may automatically get recovered (or generated if needed), for example, upon peer startup before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 910.

The ordering service 910 accepts endorsed transactions, orders them into a block, and delivers the blocks to the committing peers. For example, the ordering service 910 may initiate a new block when a threshold of transactions has been reached, a timer times out, or another condition. In the example of FIG. 9A, blockchain node 922 is a committing peer that has received a new data block 950 for storage on blockchain 930.

The ordering service 910 may be made up of a cluster of orderers. The ordering service 910 does not process transactions, smart contracts, or maintain the shared ledger. Rather, the ordering service 910 may accept the endorsed transactions and specifies the order in which those transactions are committed to the distributed ledger 930. The architecture of the blockchain network may be designed such that the specific implementation of 'ordering' (e.g., Solo, Kafka, BFT, etc.) becomes a pluggable component.

Transactions are written to the distributed ledger 930 in a consistent order. The order of transactions is established to ensure that the updates to the state database 934 are valid when they are committed to the network. In accordance with one or more embodiments, the parties of the distributed ledger 930 may choose the ordering mechanism that best suits that network.

When the ordering service 910 initializes a new block 950, the new block 950 may be broadcast to committing peers (e.g., blockchain nodes 921, 922, and 923). In response, each committing peer validates the transaction within the new block 950 by checking to make sure that the read set and the write set still match the current world state in the state database 934. Specifically, the committing peer can determine whether the read data that existed when the endorsers simulated the transaction is identical to the current world state in the state database 934. When the committing peer validates the transaction, the transaction is written to the blockchain 932 on the distributed ledger 930, and the state database 934 is updated with the write data from the read-write set. If a transaction fails, that is, if the committing peer finds that the read-write set does not match the current world state in the state database 934, the transaction ordered into a block will still be included in that block, but it will be marked as invalid, and the state database 934 will not be updated.

Referring to FIG. 9B, a block 950 (also referred to as a data block) that is stored on the blockchain 932 of the distributed ledger 930 may include multiple data segments such as a block header 960, block data 970, and block metadata 980. It should be appreciated that the various depicted blocks and their contents, such as block 950 and its contents, illustrated in FIG. 9B are merely for purposes of example and are not meant to limit the scope of the example embodiments. In some cases, both the block header 960 and the block metadata 980 may be smaller than the block data 970 which stores transaction data, however this is not a requirement. The block 950 may store transactional information of N transactions within the block data 970. The block 950 may also include a link to a previous block (e.g., on the blockchain 932 in FIG. 9A) within the block header 960. For example, the block header 960 may include a hash of the header of a previous block. The block header 960 may also include a unique block number, a hash of the block data 970 of the current block 950, and the like. The block number of the block 950 may be unique and assigned in an incremental/sequential order starting from zero. The first block in the blockchain may be referred to as a genesis block which includes information about the blockchain, its members, the data stored therein, etc.

The block data 970 may store transactional information of each transaction that is recorded within the block 950. For example, the transaction data may include one or more of a type of the transaction, a version, a timestamp, a channel ID of the distributed ledger 930, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 970 may also store data 972 which adds additional information to the hash-linked chain of blocks in the blockchain 932. Accordingly, the data 972 can be stored in an immutable log of blocks on the distributed ledger 930. Some of the benefits of storing such data 972 are reflected in the various embodiments disclosed and depicted herein.

The block metadata 980 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 910. Meanwhile, a committer of the block (such as blockchain node 922) may add validity/invalidity information based on an endorsement policy, verification of read/write sets, and the like. The transaction filter may include a byte array of a size equal to the number of transactions in the block data 970 and a validation code identifying whether a transaction was valid/invalid.

Figure 10:
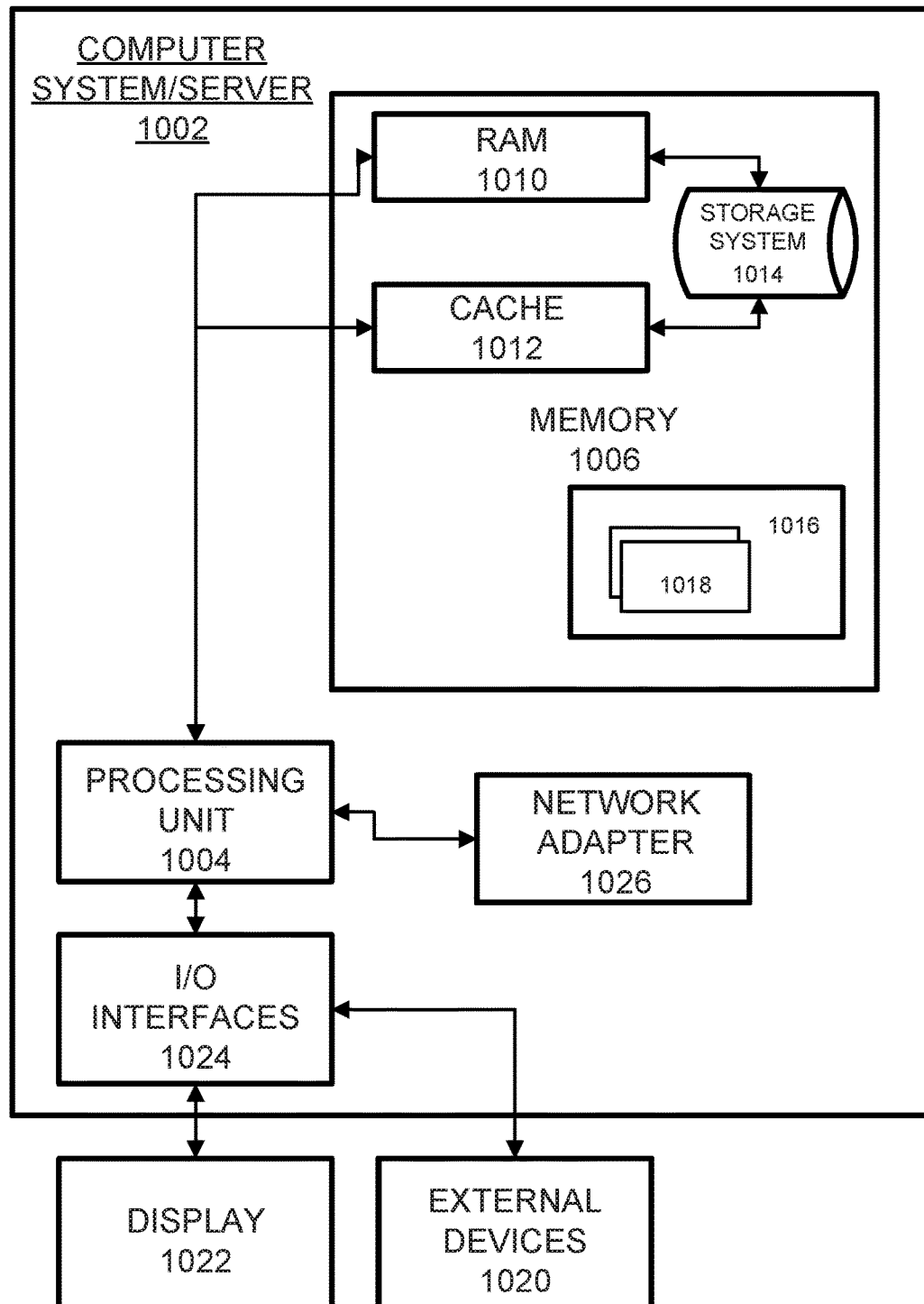
FIG. 10 illustrates an embodiment of a computing node.

FIG. 10 illustrates an embodiment of a computing node 1000 is capable of being implemented and/or performing any of the functionality set forth hereinabove. (The arrangement illustrated in FIG. 10 is not intended to suggest any limitation as to the scope of use or functionality of embodiments of the application described herein).

In computing node 1000 there is a computer system/server 1002, which is operational with numerous other general purpose or special purpose computing system environments or configurations. Examples of well-known computing systems, environments, and/or configurations that may be suitable for use with computer system/server 1002 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1002 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As illustrated in FIG. 10, computer system/server 1002 in cloud computing node 1000 is shown in the form of a general-purpose computing device. The components of computer system/server 1002 may include, but are not limited to, one or more processors or processing units 1004, a system memory 1006, and a bus that couples various system components including system memory 1006 to processor 1004.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media. System memory 1006, in one embodiment, implements the flow diagrams of the other figures. The system memory 1006 can include computer system readable media in the form of volatile memory, such as random-access memory (RAM) 1010 and/or cache memory 1012. Computer system/server 1002 may further include other removable/non-removable, volatile/non-volatile computer system storage media.

By way of example only, storage system 1014 can be provided to read from and write to a non-removable, non-volatile magnetic media (not shown and typically called a "hard drive"). Although not shown, a magnetic disk drive to read from and write to a removable, non-volatile magnetic disk (e.g., a "floppy disk"), and an optical disk drive to read from or writing to a removable, non-volatile optical disk such as a CD-ROM, DVD-ROM or other optical media can be provided. In such instances, each can be connected to the bus by one or more data media interfaces. As will be further depicted and described below, memory 1006 may include one or more program products having a set of (e.g., one or more) program modules that are configured to carry out the functions of various embodiments of the application.

Program/utility 1016, having a set of (one or more) program modules 1018, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. Program modules 1018 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 1002 may also communicate with one or more external devices 1020 such as a keyboard, a pointing device, a display 1022, etc.; one or more devices that enable a user to interact with computer system/server 1002; and/or any devices (e.g., network card, modem, etc.) that enable computer system/server 1002 to communicate with one or more other computing devices. Such communication can occur via I/O interfaces 1024. Still yet, computer system/server 1002 can communicate with one or more networks such as a local area network (LAN), a general wide area network (WAN), and/or a public network (e.g., the Internet) via network adapter 1026. As depicted, network adapter 1026 communicates with the other components of computer system/server 1002 via a bus. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

Blockchain as a Service

The processing required to implement a blockchain may be significant in terms of cost and complexity. As a result, it may be difficult to find software engineers and developers who are technically proficient in this area. These and other challenges may deter companies from using blockchain in their business plans. This would be unfortunate because of the advantages blockchain has to offer relative to competing technologies.

One or more embodiments described herein offer a solution to the problems mentioned above, by providing blockchain as a service (Baas). In accordance with one embodiment, a software company may offer to generate, configure, and manage a blockchain for a customer in return for a fee. Providing such a service will free the customer from making costly expenditures on technical equipment and will reduce overhead by alleviating the need to hire large numbers of in-house software engineers to manage the blockchain. As a result, the customer can concentrate on what it does best, serving its own customer base by providing great products and services.

Figure 11:
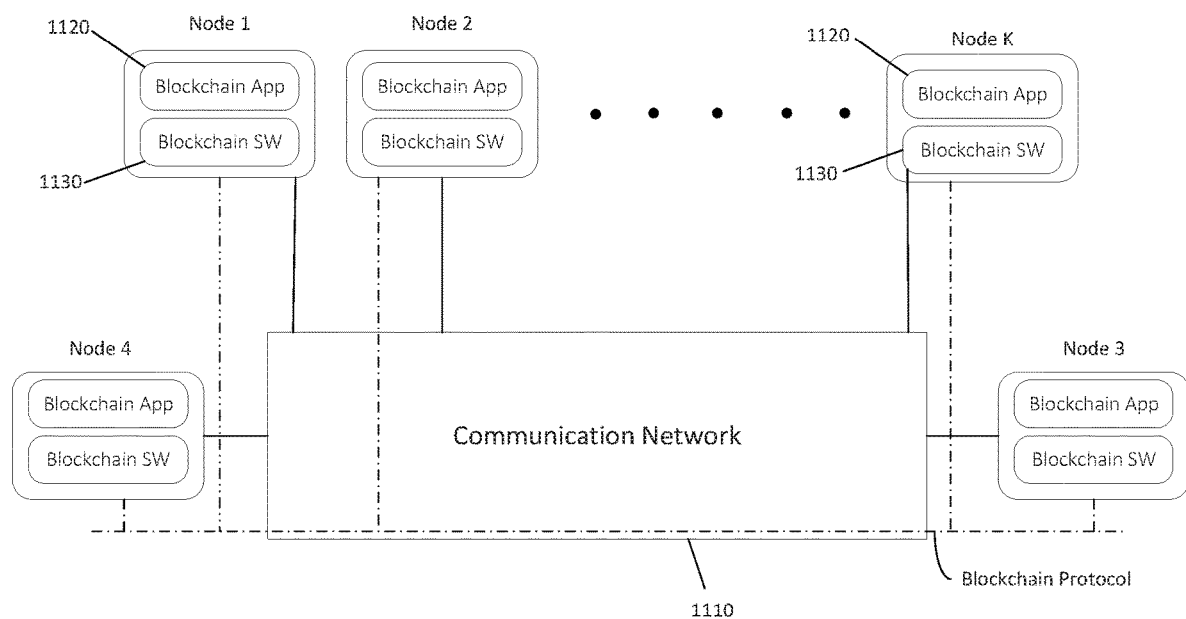
FIG. 11 illustrates an example of a blockchain network.

FIG. 11 shows an example of a blockchain network 1100 that is implemented outside the context of blockchain as a service. In this example, blockchain network 1100 includes a plurality of nodes Node 1 to Node K that are connected to a communications network 1110, which, for example, may be the Internet. The nodes may be peer nodes, each of which manages a copy of a distributed ledger corresponding to a blockchain. The communications network 1110 may be the Internet, a cloud network, or any other type of public or private network.

Each node of the plurality of nodes Node 1 to Node K may include, for example, a server, computer, or other terminal that implements a blockchain application 1120 and blockchain software 1130. The blockchain application 120 in each node may be the same type of application and, for example, may correspond to the specific type of business or information associated with the entries in the blocks of the blockchain. For example, when the blockchain protects entries that include financial information, the blockchain application 1120 may generate transaction data that is to be stored in associated blocks of the blockchain. When the blockchain protects entries that include another type of client data (e.g., image data, medical records, retail sales data, etc.), the blockchain application 1120 in each node may generate or otherwise organize the client data for storage in associated blocks of the blockchain.

In order to store the data in the blockchain, the blockchain application 1120 may be written to include various software interfaces that organize, format, and hand off the data for storage. For example, consider the case of where the blockchain stores data relating to car sales. Each node may correspond to a different dealership of a car manufacturer. The blockchain application 1120 in each node may generate and send data for storage on the blockchain throughout predetermined stages of the sales process for each car. When a sales associate enters information identifying the purchase of a car into the dealership computer terminal, that terminal may send information to the dealership server, e.g., Node 1. The blockchain application 1120 at Node 1 may organize and send data indicating the vehicle identification number, sales price, and purchaser information to be stored in a block of the blockchain. Then, the blockchain application of Node 1 may organize and send data indicating the financing the purchaser secured for the car to be stored in a subsequent block of the blockchain, and so on. The blockchain application 1120 may reside at the server only or may be split into different modules stored in the sales associate dealership terminal and the server of Node 1.

The software applications 1120 at other nodes Node 2 to Node K may perform similar operations for their respective dealerships. This may be accomplished, for example, by each node in the blockchain network storing the same blockchain software (e.g., smart contract (or chaincode), etc.). In one case, the blockchain application 1120 at one or more nodes may be different depending, for example, on differences in the ways in which the client (e.g., car dealership) at each node performs business.

The blockchain software 1130 serves as an interface between the software application 1120 and the blockchain. In one case, the blockchain software 1130 at each node may include a copy of the shared ledger, an application programming interface (API), and a smart contract (or chaincode) responsible for processing the data from the corresponding blockchain application of that node. This smart contract (or chaincode) may perform operations which include, for example, generating requests to add a new block to the blockchain, processing responses to the request from the other nodes, generating the new block, validating the data to be included in the new block, performing a consensus protocol with other nodes, generating and transmitting events among nodes in the network, querying the blockchain for data, and/or other operations as described herein. The API, smart contracts (or chaincode), and other features included in the blockchain software may, for example, correspond to those in one or more of FIGS. 1 to 10 previously discussed. The communications that take place among the nodes by each node during this process is shown by the dotted lines, which, for example, represent a predetermined blockchain protocol.

The shared ledger for the blockchain (including the new block) is then stored at the other nodes, so that each node stores or otherwise has access to the latest copy of the shared distributed ledger. Each node in the blockchain network may store the same blockchain software (e.g., smart contract (or chaincode), etc.) or may store different variations depending, for example, on differences in the blockchain applications 1120 at those nodes. In one case, two or more of the nodes Node 1 to Node K may store multiple smart contracts and corresponding chaincode, either for the same blockchain or different blockchains. Because the ledger is immutable, the data stored in the blockchain is protected in terms of its validity and integrity.

Figure 12:
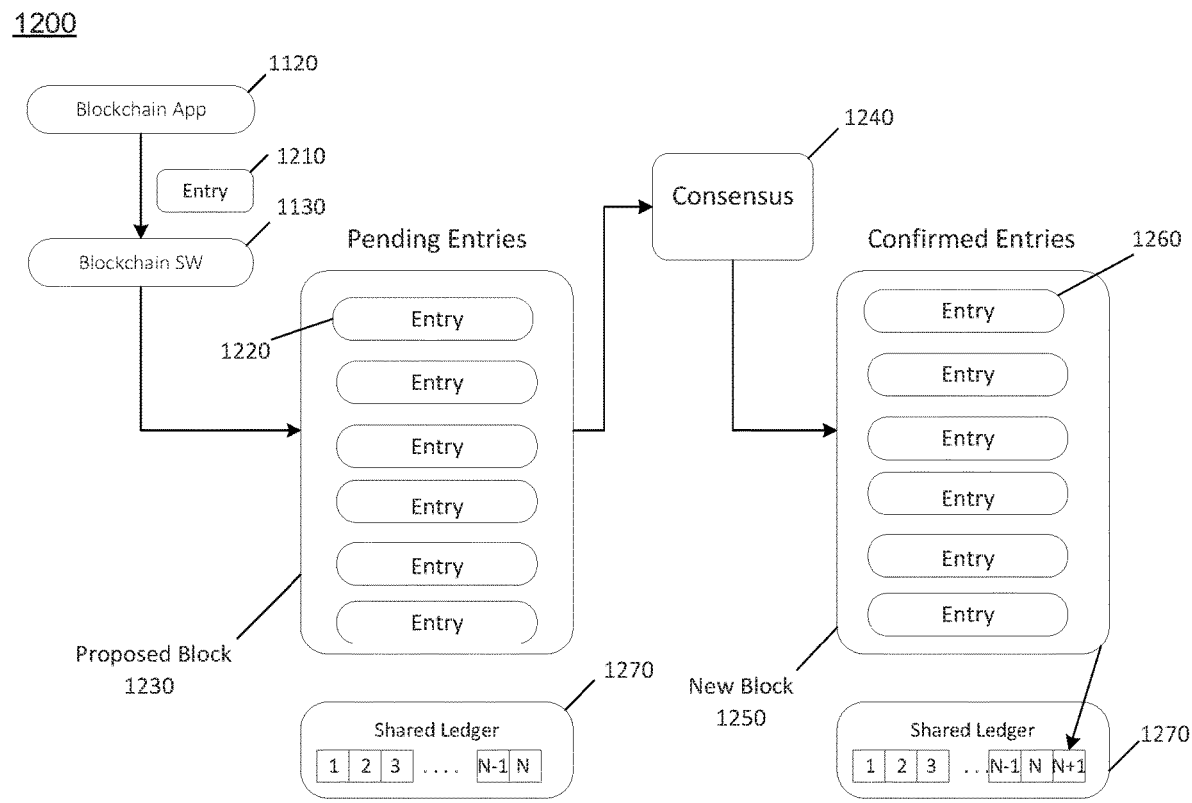
FIG. 12 illustrates an example of a process to add a new block to a blockchain.

FIG. 12 shows an example 1200 of how blocks may be added to the blockchain by each node in the network of FIG. 11. In example 1200, the blockchain application 1120 of the node submits an entry 1210 to the corresponding blockchain software 1130. The entry 1210 may include or be in the form of a request to add a block based on data or other information relating to an operation performed by the blockchain application 1120, e.g., sale of a car in the example previously discussed. In one case, the request may include or prompt a POST of a transaction in Hyperledger composer API.

The blockchain software 1130 may maintain entries in two categories: pending and confirmed. When entry 1220 is received, the blockchains software 1130 may add this entry to other pending entries 1220 which have not yet received consensus from the other peer nodes in the network. These entries may be stored in an order queue in what may be referred to as a proposed block 1230 to be added to the blockchain. The pending entries may be input into a consensus protocol 1240 involving the other peer nodes. The pending entries may be input one-by-one for consensus, or the entire propose block 1230 may be input for consensus. Once consensus has been received (e.g., through proof-of-work, proof-of-state, etc.) among all the peer nodes in the blockchain network, the blockchain software 1130 may form a new block 1250 including entries 1260 that correspond to all or a portion of the pending entries. The new block 1250 is then appended to the previously blocks in the shared ledger 1270 maintained by all of the peer nodes. The blocks in the blockchain may include pointers to (e.g., hashed values for) previous blocks and are cryptographically signed to maintain integrity.

The process of managing a blockchain as indicated in FIGS. 11 and 12 may be cause substantial delays or include inefficiencies, at least in some cases. For example, in order to receive consensus, each pending entry is sent to all participating peer nodes for confirmation. This process can be time-consuming. Moreover, it takes significant time for the peer nodes to respond, if for no other reason that the network conditions at the geographic locations of the nodes, which, in some cases, may be dispersed throughout the world. Thus, the processing of adding blocks to the blockchain and maintaining the ledger can be complex and slow.

Figure 13:
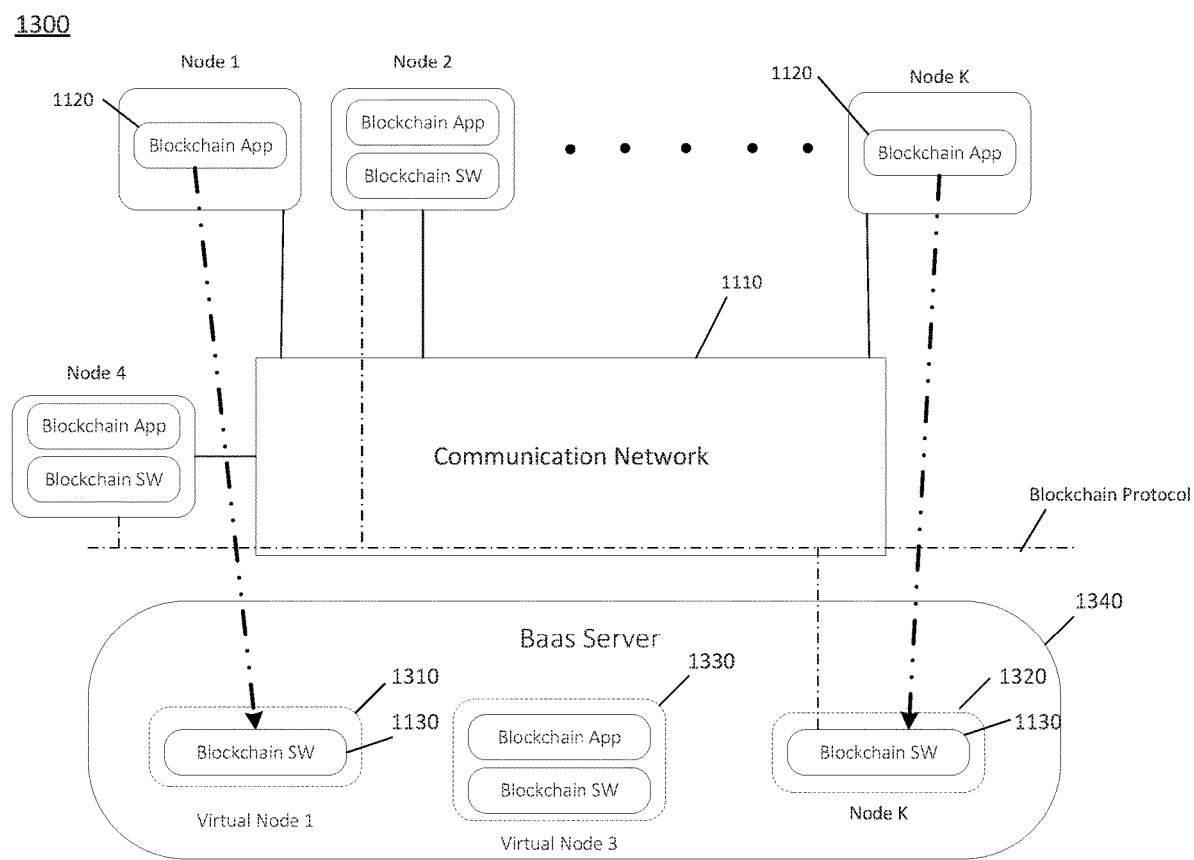
FIG. 13 illustrates a blockchain-as-a-service (Baas) embodiment.

FIG. 13 shows a blockchain as a service (Baas) embodiment 1300 which may overcome delays and other inefficiencies associated with the examples shown in FIGS. 11 and 12. In this Baas embodiment, one or more of the nodes are different from one or more other nodes in the network. For example, each of Nodes 1 and K may include the blockchain application 1120, but do not include blockchain software 1130. The blockchain software 1130 for these nodes may be stored in corresponding virtual nodes 1310 and 1320 maintained by a hosted Baas provider 1340, which, for example, may be a software company offering the Baas service.

The virtual nodes 1310 and 1320 allow the Baas provider to perform the operations of the blockchain software 1130 on behalf of the blockchain participants (e.g., customers) which own or operate Nodes 1 and K. This takes the processing burden and its associated costs off the blockchain participants of Nodes 1 and K, freeing them to focus on their respective businesses while paying a fee for the Baas service. This also alleviates the need for the blockchain participants of Nodes 1 and K to hire additional software engineers to manage their blockchain nodes, resulting in additional costs savings and time efficiencies for these participants.

In order to implement this Baas embodiment, the blockchain applications of Nodes 1 and K must be written to communicate with virtual nodes 1310 and 1320, respectively. This may be accomplished, for example, by incorporating an appropriate communication interface in or coupled to the blockchain application which exchanges entries, messages, and other information for managing the shared ledger and committing blocks to the blockchain, among other operations. The communication path between Nodes 1 and K and their respective virtual nodes 1310 and 1320 may take place through the communication network 1110 or through a different (e.g., peer-to-peer connection) path, shown by the dotted lines in FIG. 13.

The Baas provider 1340 may include additional virtual nodes 1330 for other nodes in the blockchain network or for other nodes in a different blockchain network managing a different blockchain either for the same or different blockchain participants. In this latter case, the Baas provider may therefore service a diverse array of clients in their respective businesses, which, for example, may be independent from one another. Smart contracts, network policies, and or other managing information may be implemented by the Baas provider 1340 in order to prevent information from one client or customer network from inadvertently being combined with other clients or customers receiving service from the Baas provider.

In one embodiment, the Baas provider 1340 may include one or more virtual nodes 1330 that include both the blockchain application 1120 and blockchain software 1130. In this case, the Baas provider 340 may perform hosting services for the customer or owner of the virtual node 1330 in addition to its role as blockchain services provider. For example, Baas provider 1340 may serve as a web site host, performing operations that correspond to the blockchain application 1120 and the operations of the blockchain software 1130 of virtual Node 3. In one embodiment, the virtual nodes of the Baas provider may communicate with other nodes (e.g., Node 4, Node 2, etc.) that are not virtual nodes, as well as other virtual nodes, through the blockchain communication protocol (e.g., see dotted lines). In FIG. 13, box 1340 may represent a single server of the Baas provider. In another embodiment, the Baas provider may manage multiple servers, and the same blockchain may be managed by the Baas server for virtual nodes that span its multiple servers.

Figure 14:
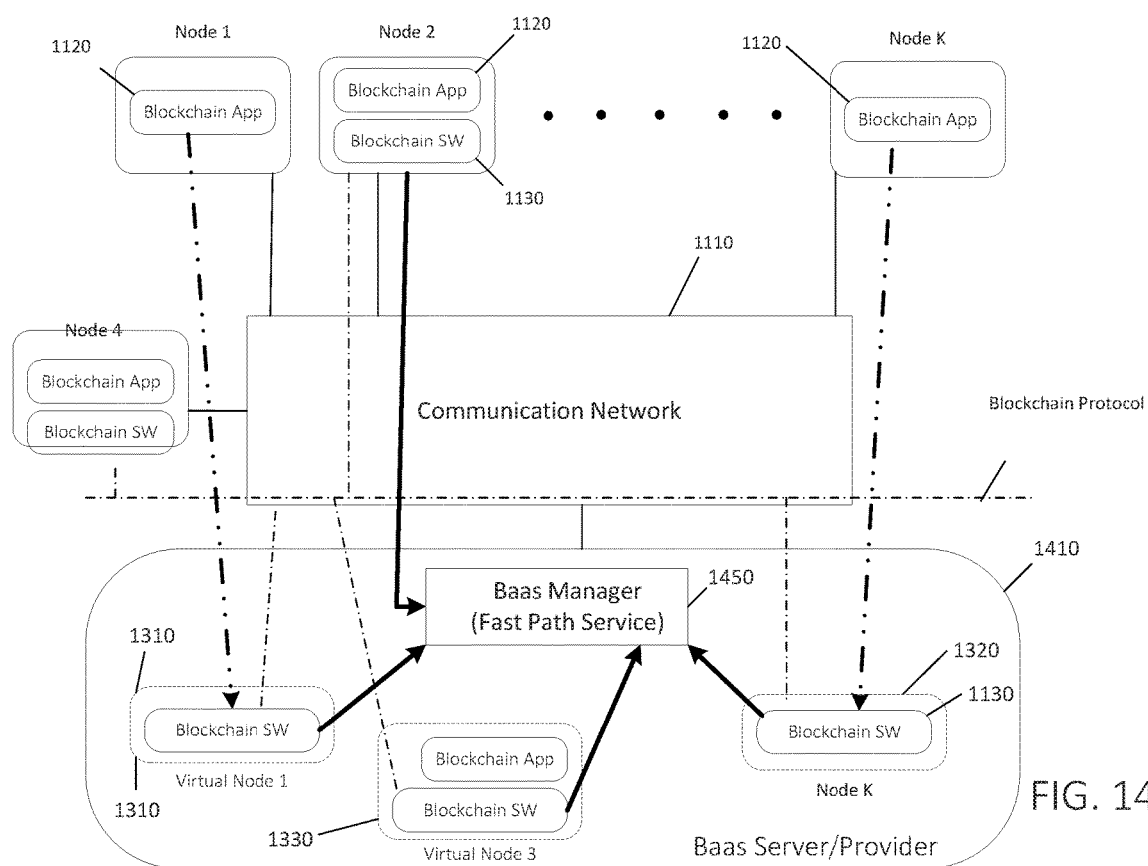
FIG. 14 illustrates a Baas provider which includes a fast path service.

FIG. 14 shows another embodiment 1400 including one or more servers 1410 implementing blockchain as a service. However, unlike the embodiment of FIG. 13, the Baas embodiment 1400 includes a manager 1450 which performs a fast path service that communicates with non-virtual and/or virtual nodes of the blockchain network. While the fast path service is shown as an operation performed by the Baas manager, the fast path service may be performed by the blockchain software of one or more of the virtual nodes in the Baas provider in other embodiments, or fast path services may be performed by both the Baas manager 1450 and the blockchain software in one or more of the virtual nodes.

In such a network, many agents may be using the Baas server 1410 simultaneously, either relative to the same blockchain or multiple blockchains. The agents may be nodes in the blockchain network having virtual nodes in the Baas provider, clients connected to the nodes, users of the clients, or other devices coupled to submit, receive, or manage information relating to the blockchain network. Without the fast path service, bottlenecks and other processing delays will undoubtedly occur that will adversely affect the efficiency and responsiveness of blockchain operations. Some of these delays may occur transparently to the users. But, more often than not, the delays will disrupt node and application performance.

The fast path service 1450 may reduce delays and otherwise increase processing efficiency relative to the nodes and virtual nodes in the blockchain network. In one embodiment, the fast path service 1450 may ensure that entries in the distributed shared ledger of the blockchain are made available to other agents without significant delays. This may be accomplished by logic (e.g., software, hardware, or a combination) that implements one of more of the following approaches for streamlining processing performance:

a) perform a single transfer of information from an agent to a hosted server of a Baas provider, instead of multiple transfers of information across multiple agents, b) replace agent-to-agent communications with a server-to-server communication, c) store large files in a single location and using simple pointers to them, and d) transfer a confirmed block of entries into one or more new blocks without storing the entries in a pending queue.

Single Transfer of Information

Figure 15:
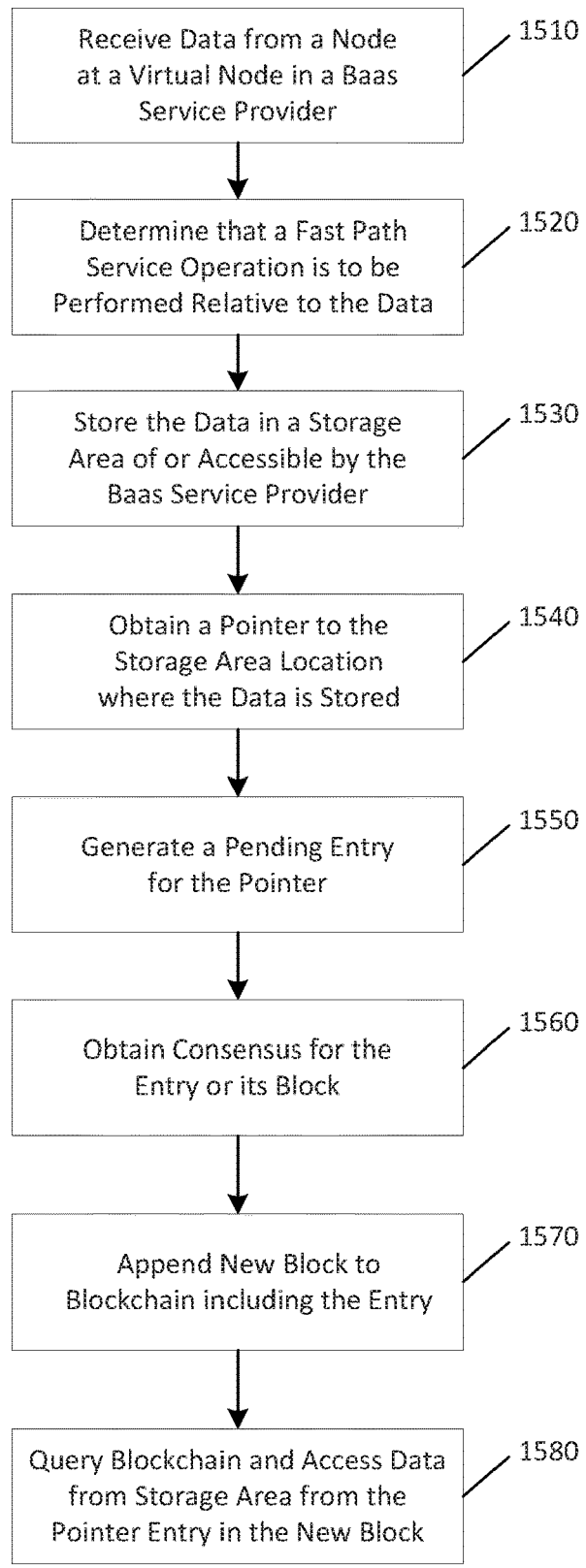
FIG. 15 illustrates a fast path service according to an embodiment.
Figure 16:
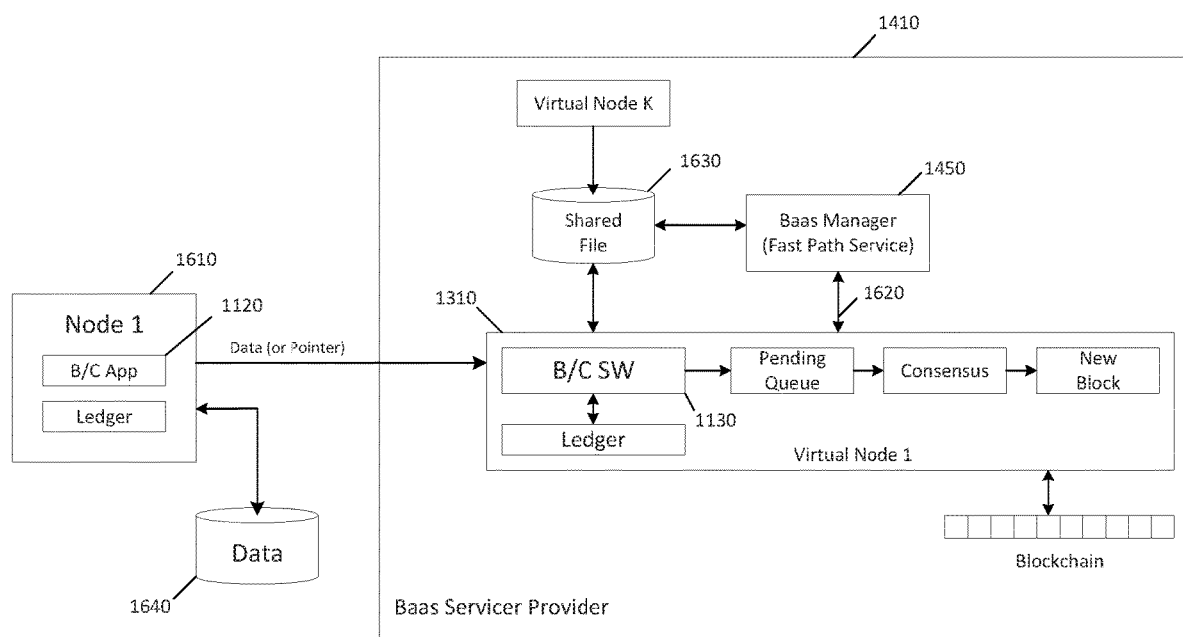
FIG. 16 illustrates a fast path service according to an embodiment.

FIG. 15 shows an embodiment of a method 1500 that may be performed by fast path service 1450 to implement approach a) for one or more nodes that are co-hosted by the Baas provider, which may be server 1410. FIG. 16 shows an example of the process flow 1600 that may be performed when the method of FIG. 15 is implemented.

Referring to FIGS. 15 and 16, at 1510, the blockchain application 1120 in a node 1610 of the blockchain network sends a file, data, or other information (commonly referred to as data) to a corresponding virtual node 1310 in the Baas server 1410. The blockchain software 1130 in the virtual node receives the data, but does not place an entry in the pending queue or block (e.g., queue 1230 in FIG. 12) for the blockchain. Rather, at 1520, the blockchain software 1130 of the virtual node determines that a fast path service operation is to be performed for the data.

Determining that a fast path service operation is to be performed may be based on one or more predetermined conditions. In one embodiment, the blockchain application 1120 of the node may detect the size of the data to be sent to the virtual node of the Baas provider. If the data exceeds a predetermined size, then the blockchain application 1120 may provide information to the blockchain software 1130 in the corresponding virtual node that a particular fast path service operation is to be performed. The information may be sent, for example, by setting a flag in a field of a packet sent with the data, including an identifier in a packet header, or transmitting an event or message to the blockchain software 1130 in the virtual node. In one embodiment, the blockchain software 1130 may determine the size of the data received from the blockchain application 1120 and notify the fast path service accordingly.

Once it has been determined that a fast path service operation is to be performed, the blockchain software 1130 may send the data and/or a notification signal 1620 to the fast path service 1450. The notification signal may notify the fast path service 1450 that data has been received at the virtual node and that a fast path service operation is to be performed. The notification signal may also include one or more bits indicating the type of fast path service operation to be performed, when, for example, the fast path service is capable of performing multiple types of operations. Based on the notification signal, the fast path service 1450 may perform one or more operations for reducing delays in connection with obtaining consensus for an entry to be included in a new block to be appended to the blockchain for the received data and/or for otherwise managing operations performed in connection with the blockchain.

At 1530, the fast path service operation may involve the fast path service 1450 instructing the blockchain software 1130 to store the received data in a memory, database, or some other storage area 1630. In one embodiment, the fast path service 1450 may receive and store the data in area 1630. Once the data has been stored, at 1540, the fast path service 1450 receives a pointer (not the data itself), for example, from the storage area itself, the blockchain software 1130, or another type of manager of the Baas provider that manages data storage operations. In one embodiment, the blockchain software 1130 of the virtual node may receive the pointer. The pointer may include, for example, an address corresponding to the location in the memory, database, or storage area where the data is stored. In one implementation, the pointer may include a website address or other information identifying where the data has been stored.

If the fast path service 1450 receives the pointer, then, at 1550, the fast path service 1450 sends the pointer to the blockchain software 1130 at the virtual node. Otherwise, the blockchain software 1130 (which received the pointer) adds an entry in a pending queue that corresponds to the pointer, but not the data. The blockchain software may perform these operations based on instructions from the fast path service or based on instructions programmed into its own software at the virtual node. Then, at 1560, the entry (either alone or along with other entries) may be submitted for consensus. A new block including the entry may be appended to the blockchain when consensus is confirmed, at 1570. In one embodiment, the fast path service 1450 may manage adding the entry to the pending queue, consensus, and new block generation.

When the data is to be retrieved by the node or a different node, then, at 1580, the blockchain may be queried to recover the pointer. The pointer may then be used to access the data at the storage location identified by the pointer.

Thus, the fast path service 1450 allows only a single transfer of data to be performed in order to append a block to the blockchain that corresponds to the data received from the node and to obtain that data when later queried. In other types of methods, the data would be transferred between nodes through the blockchain network as a consequence of adding a new block.

Moreover, by storing the data and generating an entry that only corresponds to the pointer, the efficiency of appending a new block to the blockchain may be substantially improved. This is especially beneficial because the delays that would otherwise be associated with storing data (and especially for large size data) in a new block (or processing that data to create a hash for the data) is reduced or eliminated. Of course, the fast path service may perform this operation for any size data, not just large size files.

Another benefit is reducing the amount of data to be stored in the distributed shared ledger. Because the new block includes an entry corresponding to the pointer, and not the actual data, the storage requirements for implementing this approach to fast path service may be substantially reduced for all nodes that store a copy of the ledger in the blockchain network. Also, when the data is stored locally at a node, the actual data is not transmitted, which reduces network traffic and frees up available bandwidth. Thus, the fast path service improves the way in which a computer operates in relation to the management, access, and protection of information stored on the blockchain.

Communications between the blockchain application in the node and the blockchain software in the virtual node may be performed, for example, through an optimized REST interface. This same interface may support communications between or among nodes using the blockchain communications protocol, or another type of interface may be used for this purpose.

If the blockchain software 1130 in a virtual node receives data from the blockchain application 1120 without information indicating that a fast path service should be performed, then the blockchain software 1130 may operate in the manner described in FIG. 12 or 13 for purposes of consensus and appending a new block to the blockchain.

In one embodiment, the blockchain application 1120 in the node may not send the data to the virtual node. In this case, the blockchain application 1120 may store the data in a local database or other storage area 1640 and then send a pointer indicative of the location or address in that local database or other storage area to the blockchain software in the virtual node. The fast path service 1450 may then operate an indicated above for purposes of adding a new block including an entry corresponding to the pointer to the blockchain.

The fast path service 1450 may implement approach a) in a number of other scenarios. For example, consider the case where a transaction occurs between Node 1 and Node 3. Assume further that Node 1 and Node 3 are hosted on the same server of the Baas provider. In the case of Node 1, the blockchain application is located at this node and the blockchain software is hosted in a virtual node of the Baas provider. In the case of Node 3, the Baas provider hosts the blockchain application and the blockchain software in a virtual node.

When the transaction occurs between Node 1 and Node 3, the fast path service 1450 may streamline efficiency of blockchain management relating to the transaction as a result of both nodes having virtual nodes in the Baas provider. For example, the fast path service 1450 may store data corresponding to the transaction in a file shared by virtual Nodes 1 and 3, and a pointer to the shared file in a storage device accessible by both virtual nodes may be incorporated within an entry of a new block to be added to the blockchain. An example of the storage device that stores the shared file is shown as database 1630 in FIG. 16.

When the fast path service 1450 invokes this shared-file approach, other nodes or virtual nodes maintained by the Baas provider (either in the same server or a different Baas server) may access the data corresponding to the transaction simply by linking to the shared file. This may be performed, for example, by querying the blockchain to locate the block with the entry that has a pointer to the shared file location in the Baas provider.

The shared file approach taken by the fast path service 1450 may preserve network resources because communication between the transacting Nodes 1 and 3 takes place through the virtual nodes inside the server (or servers) of the Baas provider, not through the blockchain network. Using the shared file approach is also more efficient because it prevents transfers of large volumes of information between the virtual node in the Baas provider. This shared file approach may also streamline efficiency of committing a new block to the blockchain and subsequently accessing the transaction data in the shared file because use of the network is avoided.

The shared file in FIG. 16 is located in database 1630 within the Baas provider. In one embodiment, the shared file may be stored in a storage area located outside of, but in communication with, the Baas provider. In this case, the storage area may be located at another location, e.g., stand-alone storage network or a network-attached storage device.

Server-to-Server Communications

Figure 17:
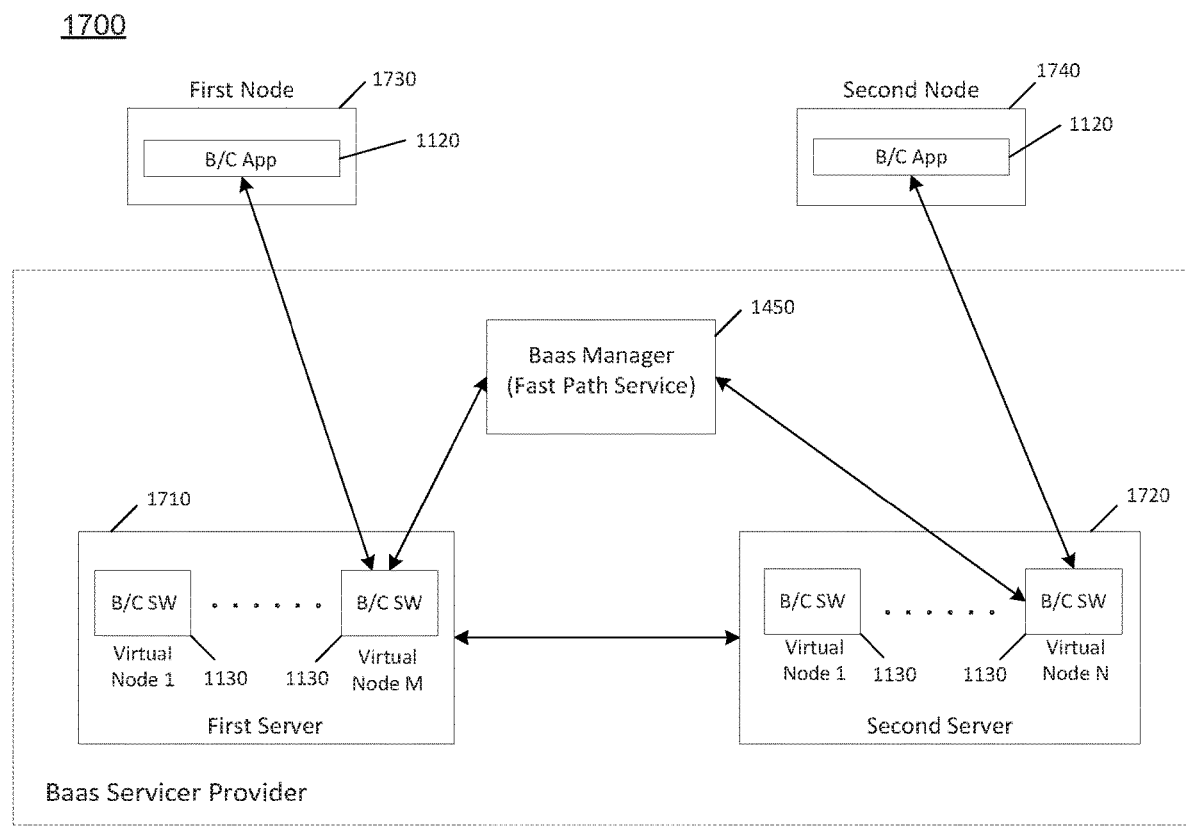
FIG. 17 illustrates a fast path service according to an embodiment.
Figure 18:
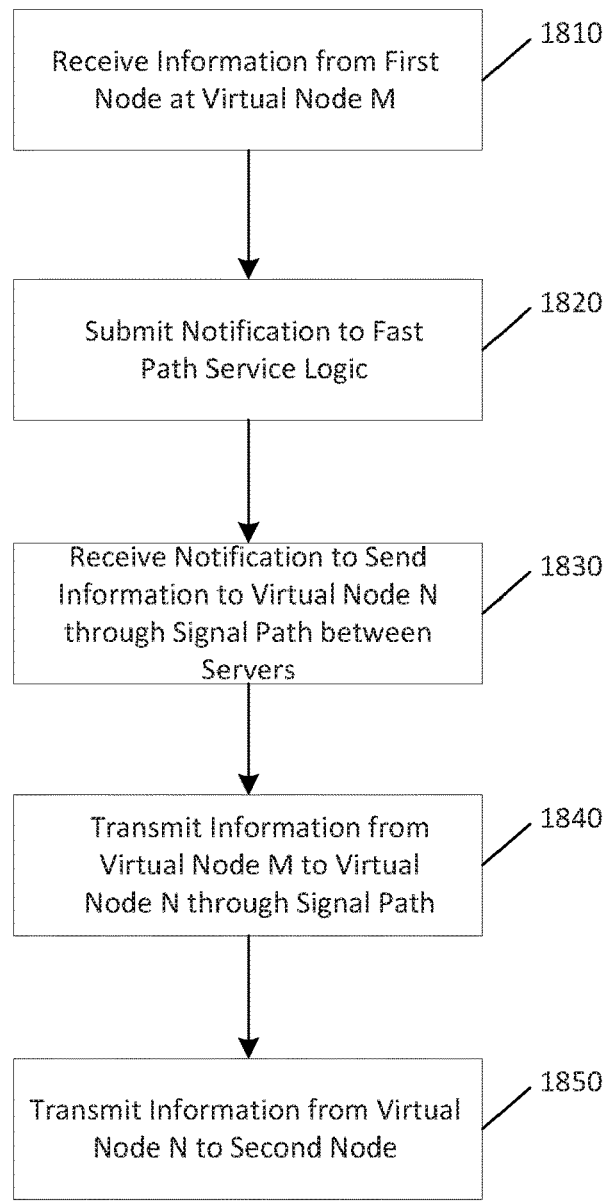
FIG. 18 illustrates a fast path service according to an embodiment.

FIG. 17 shows an embodiment of a method 1700 that may be performed by fast path service 1450 to implement approach b) for multiple agents or nodes having virtual nodes located on different servers of the Baas provider. This scenario includes, but is not limited to, a set of nodes having virtual nodes that are co-located in one server and working with another set of nodes having virtual nodes hosted on another server of the Baas provider. FIG. 18 shows an example of the process flow 1800 that may be performed when the method of FIG. 17 is implemented.

Referring to FIGS. 17 and 18, the Baas provider includes a first server 1710 and a second server 1720. The first server 1710 hosts M virtual nodes and the second server 1720 hosts N virtual nodes, where M and N may be the same number of different numbers. Because the M and N virtual nodes are hosted by the same Baas provider, the M virtual nodes in the Baas server 1710 may communicate with the N virtual nodes of the Baas server 1720 inside of the Baas provider domain. This alleviates the need for agents or nodes from communicating with one another through the blockchain network 1110 external to the Baas provider.

In one example implementation, a first node 1730 wants to communicate with a second node 1740 in the blockchain network. At 1810, the blockchain application 1120 in the first node does not communicate with the second node through the blockchain network, e.g., through communication network 1110. Rather, the blockchain application 1120 of the first node sends information to be communicated to its virtual node M in server 1710 of the Baas provider. The information may include a request to communicate information to the virtual node N of the second node, which is located in another server 1720 of the Baas provider.

At 1820, the blockchain software 1130 submits a notification to the fast path service logic 1450 indicating that information is to be sent to the second in the other server.

At 1830, the fast path service logic 1450 notifies the first node that the information is to be sent to the second node through an internal signal path 1750 located within the domain of the Baas provider. In one embodiment, the instruction (or notification) to send the information from virtual node M to virtual node N through the signal path 1750 may be programmed into the blockchain software 1130 of virtual node M. The blockchain software 1130 may perform this function by referencing a list of nodes and/or virtual nodes that are included in the servers of the Baas provider. The list may be stored at each of the virtual nodes or may be maintained by a manager of the Baas provider, e.g., the same manager which includes the fast path service logic.

At 1840, when notified by the fast path service logic 1450, the blockchain software of virtual node M transmits the information to be communicated to the blockchain software of virtual node N through the internal signal path 1750.

At 1850, the virtual node N may communicate the information received from the virtual node M through signal path 1750 to the second node, if warranted.

Because the intra-communications that take place between servers of the Baas provider are not encumbered with delays of the blockchain network 1100, information may be communicated between nodes (through their virtual nodes) using an internal data path of the Baas provider. Thus, communications may be performed far more quickly and efficiently.

The information transmitted between the virtual nodes may include, but are not limited to those associated with, data and/or other information corresponding to transactions or entries for new blocks to be added to the blockchain, consensus and validation information, events, messages, and other types of messages that take place between nodes of a blockchain network. Thus, the method of FIG. 18 may include an operation of determining that one or more of the M virtual nodes are involved in a transaction with one or more N virtual nodes, and then transmitting information between the servers of the Baas provider, as described above. In the case where the first server 1710 includes M virtual nodes and the second server 1720 includes N virtual nodes, MN exchanges of information may be performed among agents through a single exchange path 1750 between the two servers of the Baas provider.

File Storage with Pointers

Figure 19:
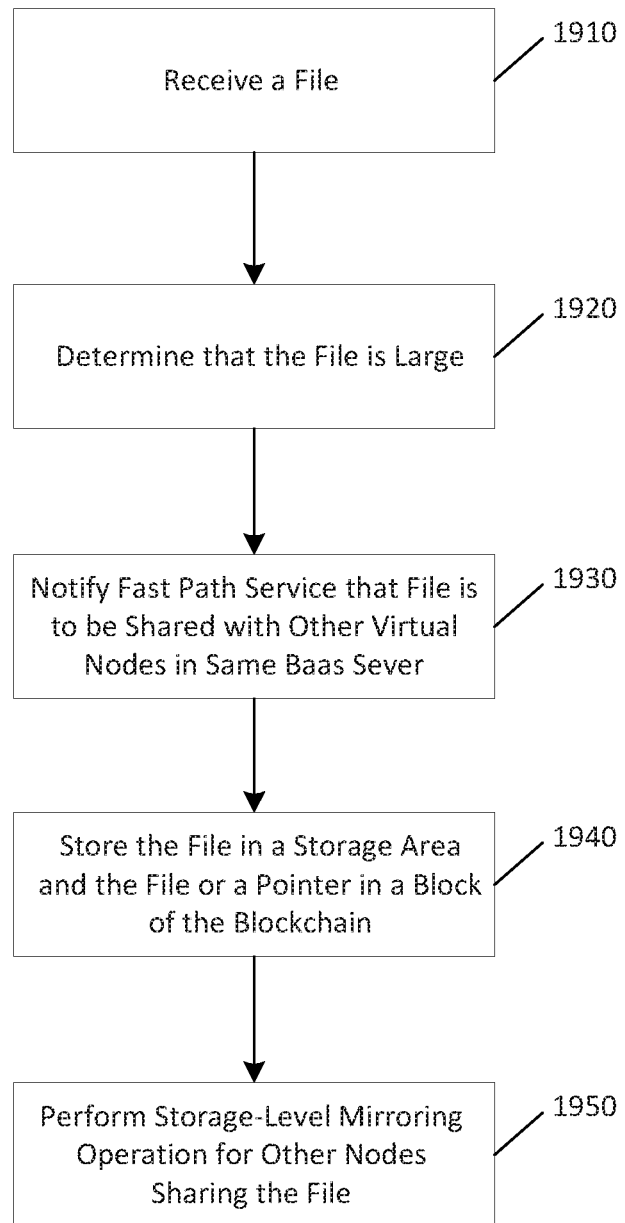
FIG. 19 illustrates a fast path service according to an embodiment.

FIG. 19 shows an embodiment of a method 1900 that may be performed by fast path service 1450 to implement approach c) for any type of node. The method includes, at 1910, receiving a file at a virtual node of the Baas provider. The file may be received by a blockchain application 1120 at a corresponding node in the blockchain network or from a blockchain application 1120 that is also hosted by the Baas provider.

At 1920, the blockchain software 1130 of the virtual node determines that the size of the file exceeds a predetermined size, e.g., is a large file.

At 1930, the blockchain software 1130 notifies the fast path service 1450 that the file is to be shared by different virtual nodes managed by the same server of the Baas provider. The different virtual nodes may be determined by the blockchain software 1130, for example, by transaction information received from the corresponding blockchain application 1120.

At 1940, the fast path service 1450 stores the large file in a storage area of the virtual node or a storage area accessible by the virtual node. Subsequently, the large size file (or a pointer of the storage area location storing the file) may be stored in a block of the blockchain.

At 1950, the fast path service 1450 performs a storage level mirroring operation which involves mirroring storage of the file among the other nodes in the same server of the Baas provider that are to share the file. In one embodiment, one or more blocks on the blockchain that correspond to the file may be mirrored to other virtual nodes in the same server of the Baas provider. This will alleviate the need to use peer node to peer node communications among all the agents of nodes hosted by the same server.

Pending Queue to Confirmed Block Transfer

Figure 20:
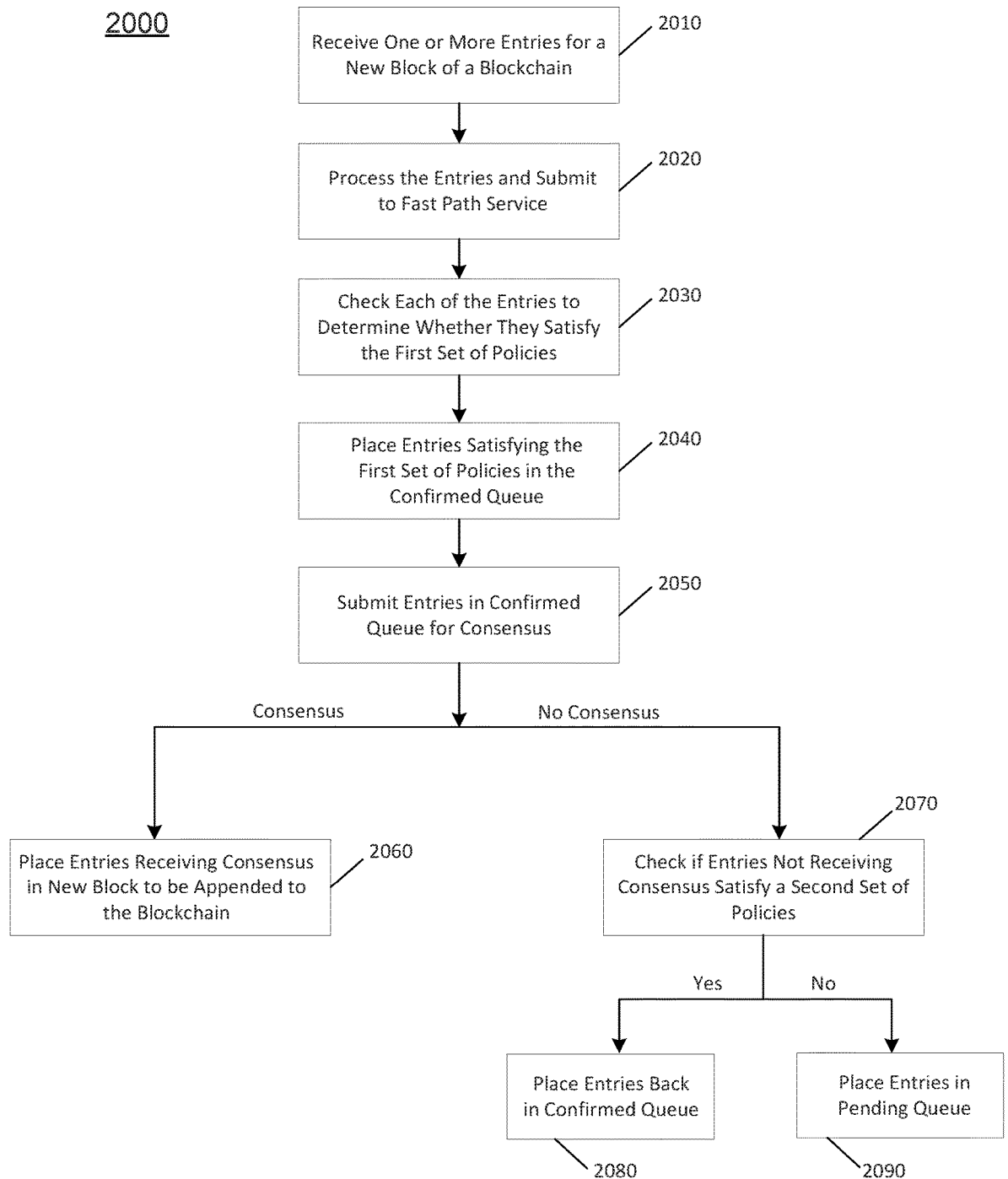
FIG. 20 illustrates a fast path service according to an embodiment.
Figure 21:
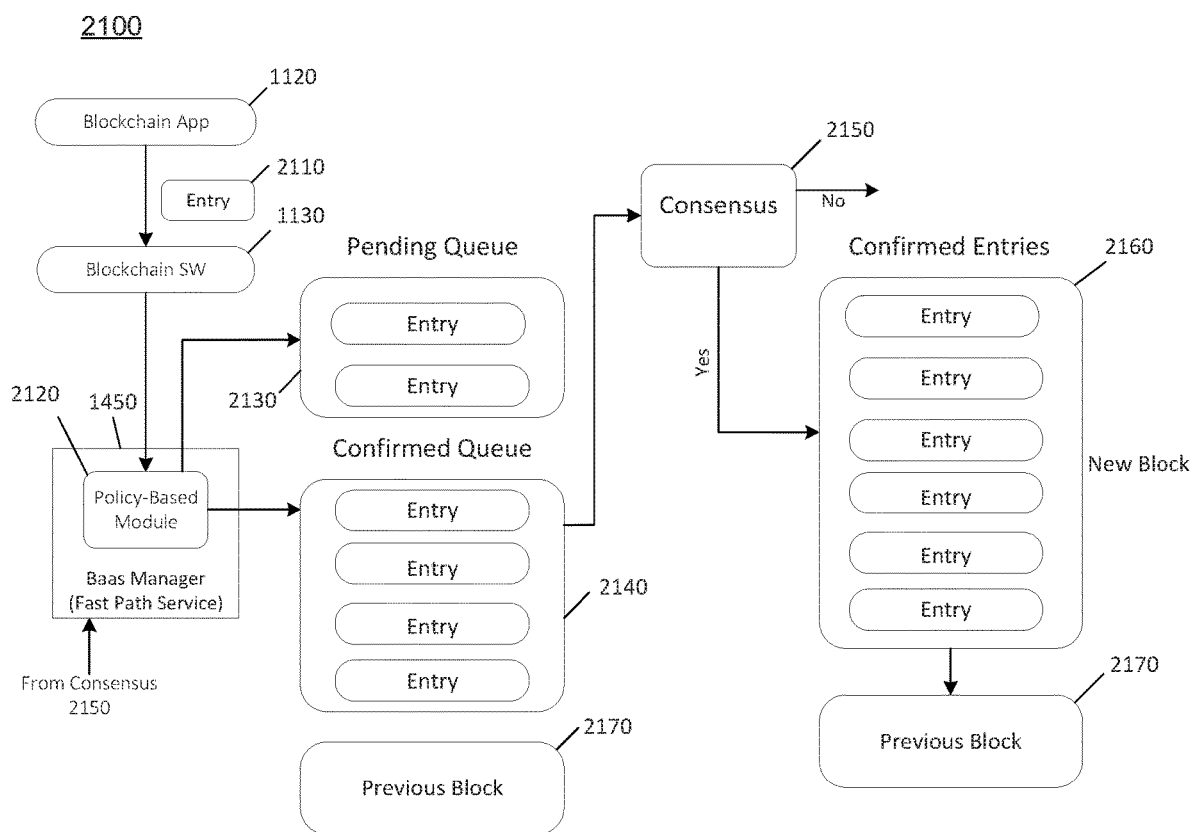
FIG. 21 illustrates a fast path service according to an embodiment.

FIG. 20 shows an embodiment of a method 2000 that may be performed by fast path service 1450 to implement approach d) to improve the effective time of consensus among different agents with virtual nodes that are co-hosted by the same Baas provider. This may be accomplished by controlling the transfer of information from a pending queue to a confirmed block in a way that reduces time consensus time. FIG. 21 shows an example of one possible scenario 2100 in which the method of FIG. 20 may be implemented.

Referring to FIGS. 20 and 21, at 2010, blockchain software 1130 may receive one or more entries 2110 to be added in a new block of a blockchain from a blockchain application 1120. The blockchain application 1120 may be located at a node and the blockchain software 1130 may be located at a corresponding virtual node hosted by the Baas provider. In one embodiment, both the blockchain application 1120 and the blockchain software 1130 may be hosted by the Baas provider.

Each entry 2110 may include information to be incorporated within a new block of the blockchain or which otherwise is associated with the blockchain and/or its attendant nodes and virtual nodes. For example, each entry may include information corresponding to one or more transactions with a customer and/or between nodes, data, files, public and/or private key information, digital certificates, permissions, policies, chaincode information, events, or messages.

At 2020, the blockchain software 1130 processes the entry in a manner compatible with blockchain submissions and submits the entry 2110 to a policy-based module 2120 of the fast path service 1450.

At 2030, the policy-based module 2120 checks each entry it receives against a first set of policies stored in the virtual node of the blockchain software 1130 or otherwise accessible to this virtual node. In one embodiment, the first set of policies may be stored in chaincode associated with the virtual node or in a Baas manager 1450, which, for example, may be included in the logic of the fast path service. For illustrative purposes only, the policy-based module 2120 is shown in FIG. 21 as being included in the logic of the fast path service.

At 2040, each entry that satisfies the set of policies is not placed in a pending queue 2130 with other pending entries that do not satisfy the first set of policies. Rather, the policy-based module 2120 places entries that satisfy the first set of policies into a confirmed queue 2140

At 2050, the entries in the confirmed queue 2140 are submitted to a consensus protocol without performing validation and/or other pre-consensus processes that ordinarily would be performed for pending entries. Thus, the entries in buffer 2140 do not have pending status, but rather are treated as if they have already been validated, confirmed, and satisfied all of the other blockchain processes that may take place before consensus of a pending entry. The reason that the entries in the confirmed queue may be treated in this manner is because they satisfy the first set of policies, which make validation, confirmation, etc., unnecessary. The entries in buffer 2140, therefore, are given higher priority status than the pending status of entries in pending queue 2130.

Because of their higher priority status, the entries in buffer 2140 are submitted to a consensus protocol 2150, which, for example, may involve proof-of-work, proof-of-state, or one or more other types of consensus protocols. For at least those nodes in the blockchain network that hosted by (e.g., has a virtual node in) the Baas provider, consensus may be performed based on internal communications that take place within the domain of the Baas provider. For nodes that are not hosted by the Baas provider, consensus may be performed based on communications through the network 1110.

At 2060, once consensus is obtained for the entries subject to the fast path service, the entries are included with other confirmed entries in a new block 2160 that is appended to the last previous block 2170 of the blockchain.

At 2070, if consensus is not obtained for one or more of the entries output from buffer 2140, then a second set of policies (different from the first set of policies) may be used to determine whether the entries that did not receive consensus should remain in buffer 2140 or placed in the pending queue 2130. Each of the first and second sets of policies may include one or more policies.

At 2080, if the entries that did not receive consensus satisfy the second set of policies, the entries may be returned to the fast path service 1450. The policy-based module 2120 in the fast path service may then place the entries back in the confirmed queue 2140, where they will be resubmitted for consensus.

At 2090, if the entries that did not receive consensus do not satisfy the second set of policies, then the consensus protocol 2150 returns the entries to the fast path service. The policy-based module 2120 in fast path service then places the entries in pending queue 2130.

To further illustrate the fast path service of this embodiment, consider the case where a transaction occurs among nodes in the blockchain network. The first set of policies governing the operation of the fast path service may include the following policy: is the transaction only between or among virtual nodes on the same Baas server? If the answer is yes, then the set of applicable policies in this example is satisfied and the fast path service places an entry corresponding to the transaction into the confirmed queue 1240. This operation may be performed since nodes on another server of the Baas provider are not involved in consensus for the entry corresponding to the transaction.

The entries in the confirmed queue 1240 are submitted for consensus. If consensus is obtained, the entries receiving consensus are included in a new block to be appended to the blockchain. If consensus is not obtained, then the entries are returned to the Baas manager implementing the fast path service, which manager may be separate from the blockchain software of the virtual node or incorporated within that software.

At this point, the Baas manager determines whether the entries satisfy a second set of policies. The second set of policies may include, for example, whether the transaction is only between or among virtual nodes in different servers hosted by the Baas provider. If so, the Baas manager may place the entries back into the confirmed queue for consensus and subsequent inclusion in a new block. If not, the Baas manager may place the entries in pending queue 2130.

If the transaction is not only between virtual nodes on the same Baas server, then the fast path service implemented on the Baas manager places the entry into the pending queue 2130, so that it may be subject to validation and other blockchain processes that take place before consensus. Other types of policies that determine when entries or transactions can be assumed to be confirmed may be applied in other embodiments. Thus, the fast path service of this embodiment may be used to streamline and improve the performance of the operation of a computer as it relates to transactions managed in a hosted environment by a Baas provider.

In other embodiments, the set of policies governing operation of the fast path service 1450 may include whether the transaction only between or among virtual nodes hosted by the same Baas provider even when the virtual nodes are on different servers of the provider. In this case, inter-server communications within the domain of the Baas provider may still afford advantages of streamlined performance relative to operation and access of information by the virtual nodes and management of the blockchain. In one or more embodiments, the first and/or second set of policies may consider, for example, the locations where the blockchain software of a node is hosted, the size of message to be transferred between or among nodes or virtual nodes, and/or the number of agents involved in a block chain transaction. In one embodiment, the consensus algorithm may determine the policies.

In accordance with one or more other embodiments, a non-transitory computer-readable medium is provided which includes instructions that control logic to perform operations corresponding to any of the system and method embodiments disclosed herein. As with other embodiments described herein, the logic may be implemented in hardware, software, or both. Such logic may correspond, for example, to the processors, managers, controllers, fast path services, applications, software, and other processing and control features of the disclosed embodiments. Examples of such a computer-readable medium are shown in the drawings referenced herein including but not limited to the Baas manager and fast path services shown in these drawings.

In accordance with one or more of the embodiments described herein, a Baas provider includes a manager than implements a fast path service that controls the transfer, storage, or other processing of information relative to one or more virtual nodes, and also generates of blocks and performs other blockchain processing operations relative to that information. By using such a Baas provider, peer-to-peer communication among different nodes may be avoided, thereby improving blockchain management efficiency.

For example, in one or more embodiments, the fast path service may allow for rapid transfer of large amounts of server data, and only a small pointer may be provided to the different virtual nodes/block change software systems in order to access the large data. Also, in one or more embodiments, the fast-path service may be used as a fast-path interface to all of the nodes that are connected to it. The fast path service, therefore, may allow for a faster way to upload information to the server from agents, as well as for the agents that are present locally to share information about the content in the same server.

Additionally, in one or more embodiments, the blockchain software in nodes that do not have a virtual node in the Baas provider may use the fast path service, such as Node 2 in FIG. 14. In one embodiment, the system may use the blockchain protocol to communicate with any node that does not have updated blockchain software, such as Node 4 in FIG. 14).

Also, in one or more embodiments, a set of policies may be used to determine when to use a protocol (e.g., fast path protocol or standard blockchain protocol). These policies may consider, for example, the locations where the node blockchain software is hosted, the size of message to be transferred, and the number of agents in a block chain transaction. In one embodiment, the consensus algorithm may determine the policies. In accordance with one or more embodiments, the fast path service and/or the Baas manager may, additionally or in the alternative, by performed by the blockchain software of one or more virtual nodes of the Baas provider.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, information sent between various modules can be sent between the modules via at least one of: a data network, the Internet, a voice network, an Internet Protocol network, a wireless device, a wired device and/or via plurality of protocols. Also, messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

The methods, processes, computer-readable mediums, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

Also, as previously explained, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments herein.

The processors, controllers, managers, fast path service, devices, modules, or other processing features of the embodiments disclosed herein may be implemented in logic which, for example, may include hardware, software, or both. When implemented at least partially in hardware, the processors, controllers, managers, fast path service devices, modules, or other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the processors, controllers, managers, fast path service logic, devices, modules, or other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein. The term "device unit data" may be or include card unique data or other type of unique device-specific data.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A blockchain-as-a-service (BaaS) provider external to a blockchain network, the BaaS provider comprising:
   a first virtual node configured to receive information including an entry to be added to a new blockchain block from a blockchain application in a first node of the blockchain network; and
   a fast path service provider to facilitate communication of the information from the first node to a second node of the blockchain network via a signal path between the first virtual node and a second virtual node of the BaaS provider, wherein the signal path is external to the blockchain network, the fast path service provider comprising:
      a memory storing one or more instructions, and
      a processor that when executing the one or more instruction is configured to:
         receive a notification from the first virtual node that the information is to be sent to the second virtual node, the second virtual node corresponding to the second node, and
         notify the first node that the information is to be sent to the second node via the signal path to cause the second virtual node to send the information to the second node.

2. The BaaS provider of claim 1, further comprising:
   a first server configured to manage the first virtual node; and
   a second server configured to manage the second virtual node.

3. The BaaS provider of claim 2, wherein the internal signal path is between the first server and the second server.

4. The BaaS provider of claim 1, wherein, when the first virtual node is configured to receive the information, the first virtual node is configured to:
   receive the information using blockchain software of the first virtual node, and
   wherein the second virtual node includes blockchain software coupled to a blockchain application in the second node.

5. The BaaS provider of claim 1, wherein the information further includes a request to communicate the information to the second virtual node.

6. The BaaS provider of claim 1, wherein the first virtual node includes blockchain software, and
   wherein the notification from the first virtual node is programmed into the blockchain software.

7. The BaaS provider of claim 1, wherein the fast path service provider is further configured to:
   control transmission of additional information between the first virtual node and the second virtual node that is not included in blocks of the blockchain.

8. A method, comprising:
   receiving, by a first virtual node in a blockchain-as-a-service (Baas) provider that is external to a blockchain network, information including an entry to be added to a new blockchain block from a blockchain application in a first node of the blockchain network;
   receiving, by a fast path service provider of the BaaS provider, a notification from the first virtual node that the information is to be sent to a second virtual node of the BaaS provider, the second virtual node corresponding to a second node of the blockchain network, and the fast path service provider facilitating communication of the information from the first node to the second node via a signal path between the first virtual node and a second virtual node, the signal path being external to the blockchain network; and
   notifying, by the fast path service provider, the first node that the information is to be sent to the second virtual node via the signal path to cause the second node to send the information to the second node.

9. The method of claim 8, further comprising:
   managing the first virtual node via a first server of the BaaS provider; and
   managing the second virtual node via a second server of the BaaS provider.

10. The method of claim 9, wherein the internal signal path is between the first server and the second server.

11. The method of claim 8, wherein the receiving the information further comprises:
   receive the information using blockchain software of the first virtual node, and
   wherein the second virtual node includes blockchain software coupled to a blockchain application in the second node.

12. The method of claim 11, wherein the information further includes a request to communicate the information to the second virtual node.

13. The method of claim 8, wherein the first virtual node includes blockchain software, and
wherein the notification from the first virtual node is programmed into the blockchain software.

14. The method of claim 8, further comprising:
controlling, by the fast path service provider, transmission of additional information between the first virtual node and the second virtual node that is not included in blocks of the blockchain.

15. A non-transitory computer-readable medium comprising one or more instructions that when executed by a processor of a Blockchain-as-service (Baas) provider that is external to a blockchain network cause the processor to:
receive, by a first virtual node of the BaaS provider, information including an entry to be added to a new blockchain block from a blockchain application in a node of the blockchain network;
receive, by a fast path service provider of the BaaS provider, a notification from the first virtual node that the information is to be sent to a second virtual node of the BaaS provider, the second virtual node corresponding to a second node of the blockchain network, and the fast path service provider to facilitate communication of the information from the first node to the second node via a signal path between the first virtual node and a second virtual node, the signal path being external to the blockchain network; and
notify, by the fast path service provider, the first node that the information is to be sent to the second node via the signal path to cause the second virtual node to send the information to the second node.

16. The non-transitory computer-readable medium of claim 15, wherein the one or more instructions further cause the processor to:
manage the first virtual node via a first server of the BaaS provider; and
manage the second virtual node via a first server of the BaaS provider.

17. The non-transitory computer-readable medium of claim 16, wherein the internal signal path is between the first server and the second server.

18. The non-transitory computer-readable medium of claim 15, wherein, when the first virtual node is to receive the information, the first virtual node further is to:
receive the information using blockchain software of the first virtual node, and
wherein the second virtual node includes blockchain software coupled to a blockchain application in the second node.

19. The non-transitory computer-readable medium of claim 18, wherein the information further includes a request to communicate the information to the second virtual node.

20. The non-transitory computer-readable medium of claim 15, wherein the one or more instructions further cause the processor to:
control transmission of additional information between the first virtual node and the second virtual node that is not included in blocks of the blockchain.

* * * * *